US011354658B2

(12) United States Patent
Lyons et al.

(10) Patent No.: US 11,354,658 B2
(45) Date of Patent: Jun. 7, 2022

(54) METHOD AND SYSTEM FOR OFFLINE BLOCKCHAIN EXCHANGES

(71) Applicant: MasterCard International Incorporated, Purchase, NY (US)

(72) Inventors: Garry Lyons, Dublin (IE); Steven Charles Davis, Saint Peters, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 624 days.

(21) Appl. No.: 15/041,519

(22) Filed: Feb. 11, 2016

(65) Prior Publication Data

US 2017/0236121 A1  Aug. 17, 2017

(51) Int. Cl.
*G06Q 20/38* (2012.01)
*G06F 16/23* (2019.01)
(Continued)

(52) U.S. Cl.
CPC ..... *G06Q 20/3829* (2013.01); *G06F 16/2365* (2019.01); *G06Q 20/06* (2013.01); *G06Q 20/102* (2013.01); *G06Q 20/20* (2013.01); *G06Q 20/204* (2013.01); *G06Q 20/34* (2013.01); *G06Q 20/341* (2013.01); *G06Q 20/3825* (2013.01);
(Continued)

(58) Field of Classification Search
CPC ......... G06Q 20/3829; G06Q 20/40975; G06Q 20/3825; G06Q 20/34
See application file for complete search history.

(56) References Cited

U.S. PATENT DOCUMENTS 6,431,454 B1 * 8/2002 Hjelmvik ............ G07F 7/0866
                                                    235/492
8,666,893 B1 * 3/2014 Jones ................... G06Q 40/02
                                                    705/44
(Continued)

FOREIGN PATENT DOCUMENTS

CN    102460490 A    5/2012
CN    104798095 A    7/2015

OTHER PUBLICATIONS

Yessi Bello Perez, "BitPay Creates Bitcoin POS Solution for Ingenico Devices", Oct. 6, 2016 (Year: 2016).*
(Continued)

*Primary Examiner* — Patrick McAtee
*Assistant Examiner* — Timothy Paul Sax
(74) *Attorney, Agent, or Firm* — Buchanan Ingersoll & Rooney PC

(57) ABSTRACT

A method for conducting an offline data exchange associated with a blockchain includes: storing a structured data set associated with a blockchain network, the data set including a network identifier, unspent output hash, output index, output value, and key pair; receiving the network identifier and a transaction amount from a point of sale; validating the structured data set as including the network identifier and an output value greater than or equal to the transaction amount; transmitting the unspent output hash and output index to the point of sale; receiving a destination address from the point of sale; generating transaction data including the destination address and a payment amount based on the transaction amount; and transmitting the transaction data to the point of sale.

22 Claims, 11 Drawing Sheets

(51) Int. Cl.
  *G07F 7/12* (2006.01)
  *G06Q 20/40* (2012.01)
  *G06Q 20/34* (2012.01)
  *G06Q 20/06* (2012.01)
  *G06Q 20/20* (2012.01)
  *H04L 9/32* (2006.01)
  *G06Q 20/10* (2012.01)

(52) U.S. Cl.
  CPC ... *G06Q 20/3827* (2013.01); *G06Q 20/40975* (2013.01); *G07F 7/127* (2013.01); *H04L 9/3236* (2013.01); *G06Q 2220/00* (2013.01); *H04L 2209/38* (2013.01); *H04L 2209/56* (2013.01)

(56) References Cited

U.S. PATENT DOCUMENTS

| | | | |
|---|---|---|---|
| 2011/0131104 | A1 | 6/2011 | Rose et al. |
| 2014/0081737 | A1 | 3/2014 | Gilman et al. |
| 2015/0046337 | A1 | 2/2015 | Hu et al. |
| 2015/0170112 | A1 | 6/2015 | Decastro |
| 2015/0199684 | A1 | 7/2015 | Maus |
| 2015/0363782 | A1 | 12/2015 | Ronca et al. |
| 2015/0365283 | A1 | 12/2015 | Ronca |
| 2015/0371224 | A1* | 12/2015 | Lingappa ........... G06Q 20/3825 705/71 |
| 2016/0005032 | A1 | 1/2016 | Yau |
| 2016/0026993 | A1* | 1/2016 | Kang ................ G06Q 20/306 705/39 |
| 2016/0335628 | A1* | 11/2016 | Weigold ............. G06Q 20/3829 |
| 2016/0358172 | A1* | 12/2016 | Ziat ..................... G06Q 20/227 |
| 2017/0180134 | A1* | 6/2017 | King ..................... H04L 9/3247 |

OTHER PUBLICATIONS

International Search Report and Written Opinion issued by the International Search Authority dated Mar. 10, 2017 in corresponding PCT Application No. PCT/US2017/012900 (15 pages).
Andreas M Antonopoulos: "E-COMMERCE Mastering Bitcoin", Mar. 6, 2015 (Mar. 6, 2015), XP055351171, [retrieved on Mar. 2, 2017, from Internet URL:http://babylon.internal.epo.org/projects/babylon/evl.nsf/0/8D8A12AD04F9198DC1257FCD0041DED7/$FILE/Mastering_Bitcoin.pdf] (17 pages).
Tobias Bamert, et al.,:"BlueWallet: The Secure Bitcoin Wallet", Sep. 10, 2014 (Sep. 10, 2014), Network and Parallel Computing; [Lecture Notes in Computer Science; Lect. Notes Computer], Springer International Publishing, Cham, pp. 65-80, XP047298907 (16 pages).
"Contactless smart card—Wikipedia", Jan. 12, 2016 (Jan. 12, 2016), pp. 1-8, XP055601013, Retrieved from the Internet: URL:https://en.wikipedia.org/w/index.php?title=Contactless_smart_card&oldid=699541774 [retrieved on Jul. 1, 2019].
Communication pursuant to Article 94(3) EPC dated Jul. 5, 2019, by the European Patent Office in corresponding European Patent Application No. 17 701 951.0-1222. (9 pages).
Office Action (Communication pursuant to Article 94(3) EPC) dated Nov. 28, 2019, by the European Patent Office in corresponding European Patent Application No. 17 701 951.0-1222. (8 pages).
Antonopoulos, "Mastering Bitcoin Unlocking Digital Crypto-Currencies," Published by O'Reilly Media, Inc., (Oct. 7, 2014), Chapter 2: How Bitcoin Works, pp. 22-24.
Office Action (First Office Action) dated Oct. 9, 2021, by the China National Intellectual Property Administration in corresponding Chinese Patent Application No. 201780010961.2 and an English Translation of the Office Action. (29 pages).

* cited by examiner

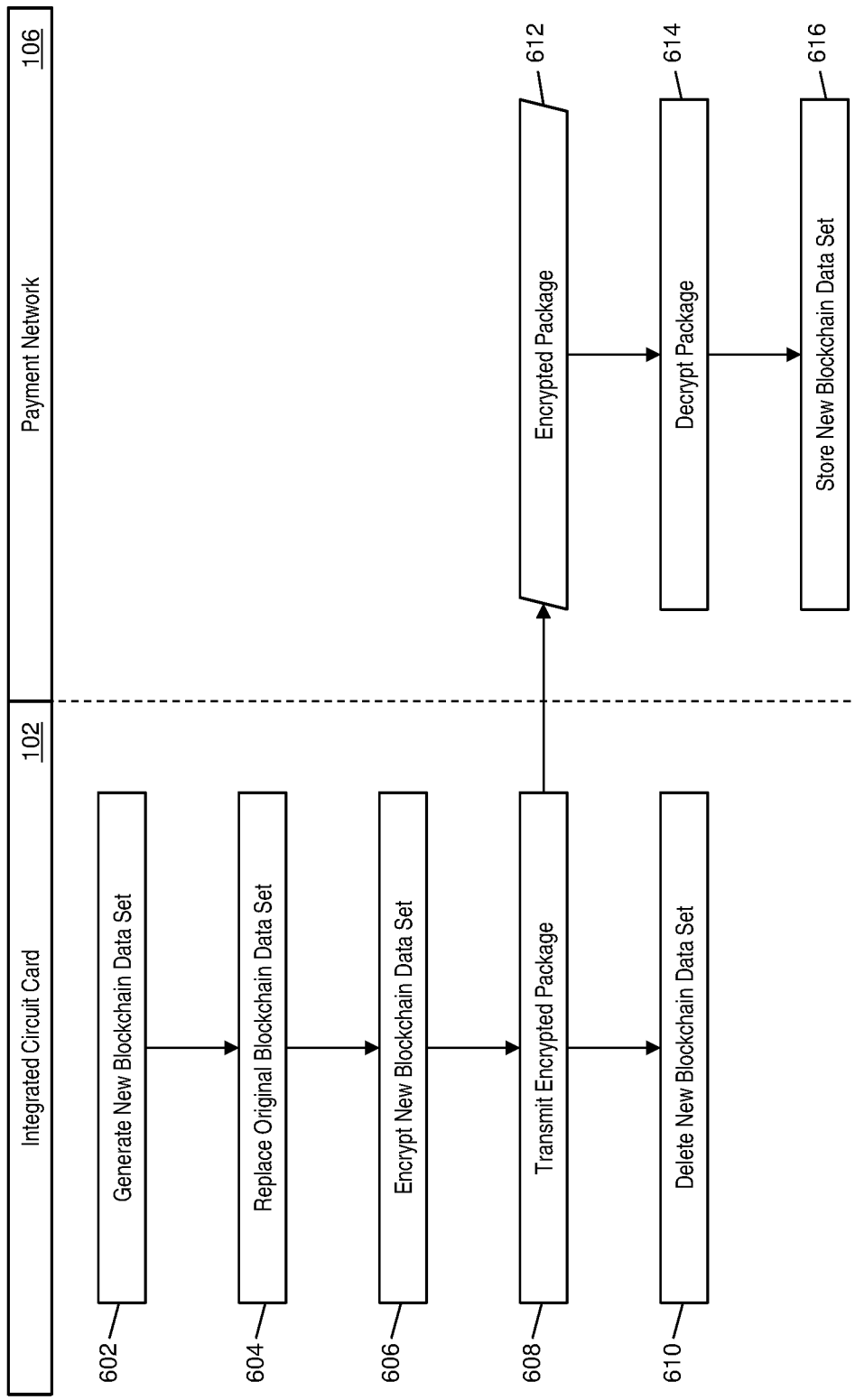

METHOD AND SYSTEM FOR OFFLINE BLOCKCHAIN EXCHANGES

FIELD

The present disclosure relates to offline data exchanges associated with a blockchain, specifically the use of a specifically programmed integrated circuit card to generate blockchain data exchanged to a computing device that is offline from other communication networks.

BACKGROUND

With the increased convenience provided by using credit cards and other similar types of payment instruments, many consumers no longer regularly carry fiat currency or other methods of payment that can be used "offline," or in instances when a point of sale device does not have a working connection to a payment network. In such instances, if a consumer presents their credit card at the point of sale, only to find out that the point of sale is offline and unable to send the transaction over the payment rails to be processed, the consumer is forced to cancel the transaction. This can have a significantly negative effect on the consumer-merchant relationship, as the consumer may be highly inconvenienced by the cancellation and may neglect to shop with that merchant in the future, which may have a large impact on the merchant's revenue. As a result, merchants are often greatly interested in keeping their point of sale devices connected to the payment networks.

Methods have been developed to increase the connectivity of point of sale devices to payment networks. For instance, in one method, a point of sale may be equipped with multiple interfaces to connect with a payment network, for redundancy in the connection. In another method, a third party entity, such as a gateway processor, may serve as an intermediary between the merchant and the payment network to help ensure connectivity and assist in communication. However, such methods often rely on improving connections between the point of sale at the merchant and the payment network for instances where the connection itself may cause the point of sale to go offline with the payment network. As such, such methods are ineffective in instances where the payment network itself may be the cause of the interruption in the connection.

Thus, there is a need for a technical solution where an electronic transaction may be still conducted and processed in instances when a point of sale device is offline with a payment network. The use of a blockchain may provide for a suitable alternative for the processing of an electronic transaction. However, it may be inconvenient and impractical for a consumer to possess sufficient blockchain currency and a suitable method for payment for use in instances when a point of sale may be offline from a payment network. Thus, there is a need for a technical solution where the electronic transaction may be conducted with an offline point of sale device using a payment card still suitable for use in traditional electronic transactions using a payment network.

SUMMARY

The present disclosure provides a description of systems and methods for conducting offline data exchanges associated with blockchains.

A method for conducting an offline data exchange associated with a blockchain includes: storing, in a memory of an integrated circuit card, a structured data set associated with a blockchain network, wherein the structured data set includes at least a network identifier, an unspent output hash, an output index, an output value, and a key pair; receiving, by a receiving device of the integrated circuit card, at least the network identifier and a transaction amount from an electronic point of sale device; validating, by a validation module of the integrated circuit card, the stored structured data set as including the network identifier and an output value greater than or equal to the received transaction amount; electronically transmitting, by a transmitting device of the integrated circuit card, at least the unspent output hash and the output index to the electronic point of sale device; receiving, by the receiving device of the integrated circuit card, at least a destination address from the electronic point of sale device; generating, by a generation module of the integrated circuit card, transaction data, wherein the transaction data includes at least the received destination address and a payment amount based on at least the transaction amount; and electronically transmitting, by the transmitting device of the integrated circuit card, the transaction data to the electronic point of sale device.

Another method for conducting an offline data exchange associated with a blockchain includes: storing, in a memory of an electronic point of sale device, at least a key pair including a private key and a public key, a network identifier, and a transaction amount; electronically transmitting, by a transmitting device of the electronic point of sale device, at least the network identifier and the transaction amount to an integrated circuit card; receiving, by a receiving device of the electronic point of sale device, at least an unspent output hash and an output index from the integrated circuit card; validating, by a validation module of the electronic point of sale device, the received unspent output hash; generating, by a generation module of the electronic point of sale device, a destination address via application of one or more hashing algorithms to the public key included in the stored key pair; electronically transmitting, by the transmitting device of the electronic point of sale device, at least the generated destination address to the integrated circuit card; receiving, by the receiving device of the electronic point of sale device, at least a transaction data set from the integrated circuit card, wherein the transaction data set includes at least the generated destination address and a payment amount based on the transaction amount; and electronically transmitting, by the transmitting device of the electronic point of sale device, at least the received transaction data set to a computing device associated with a blockchain network corresponding to the network identifier.

A system for conducting of offline data exchange associated with a blockchain includes: a generation module of an integrated circuit card; a memory of the integrated circuit card configured to store a structured data set associated with a blockchain network, wherein the structured data set includes at least a network identifier, an unspent output hash, an output index, an output value, and a key pair; a receiving device of the integrated circuit card configured to receive at least the network identifier and a transaction amount from an electronic point of sale device; a validation module of the integrated circuit card configured to validate the stored structured data set as including the network identifier and an output value greater than or equal to the received transaction amount; and a transmitting device of the integrated circuit card configured to electronically transmit at least the unspent output hash and the output index to the electronic point of sale device, wherein the receiving device of the integrated circuit card is further configured to receive at least a destination address from the electronic point of sale device, the generation module of the integrated circuit card is configured to generate transaction data, wherein the transaction data includes at least the received destination address and a payment amount based on at least the transaction amount, and the transmitting device of the integrated circuit card is further configured to electronically transmit the transaction data to the electronic point of sale device.

Another system for conducting an offline data exchange associated with a blockchain includes: a memory of an electronic point of sale device configured to store at least a key pair including a private key and a public key, a network identifier, and a transaction amount; a transmitting device of the electronic point of sale device configured to electronically transmit at least the network identifier and the transaction amount to an integrated circuit card; a receiving device of the electronic point of sale device configured to receive at least an unspent output hash and an output index from the integrated circuit card; a validation module of the electronic point of sale device configured to validate the received unspent output hash; and a generation module of the electronic point of sale device configured to generate a destination address via application of one or more hashing algorithms to the public key included in the stored key pair, wherein the transmitting device of the electronic point of sale device is further configured to electronically transmit at least the generated destination address to the integrated circuit card, the receiving device of the electronic point of sale device is further configured to receive at least a transaction data set from the integrated circuit card, wherein the transaction data set includes at least the generated destination address and a payment amount based on the transaction amount, and the transmitting device of the electronic point of sale device is further configured to electronically transmit at least the received transaction data set to a computing device associated with a blockchain network corresponding to the network identifier.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIG. 6 is a flow diagram illustrating a process for the unloading of a structured data set of an integrated circuit card following an offline data exchange for continued usage of the integrated circuit card in accordance with exemplary embodiments.

Figure 1:
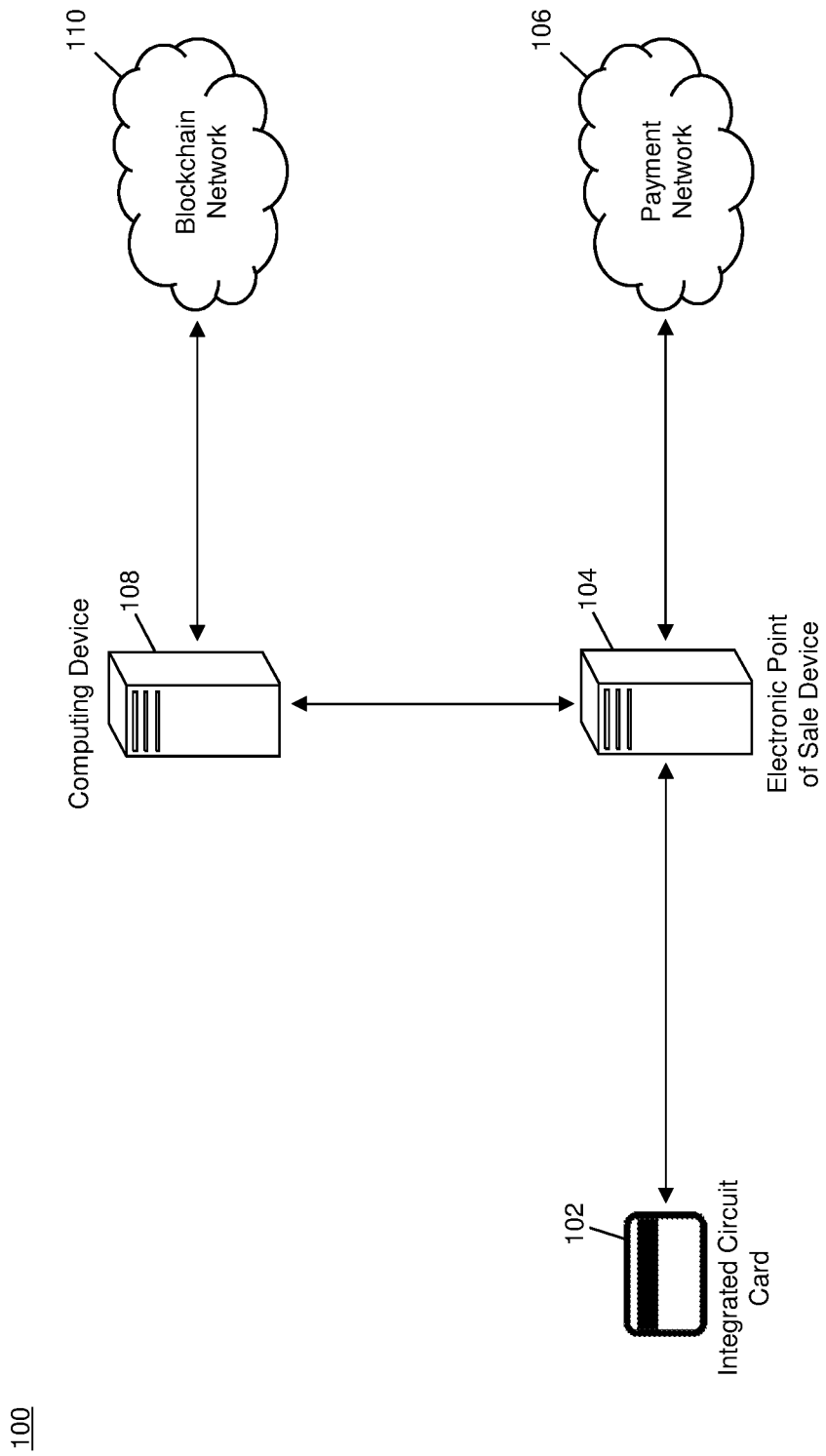
FIG. 1 is a block diagram illustrating a high level system architecture for the conducting of offline data exchanges associated with a blockchain network using integrated circuit cards and electronic point of sale devices in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, additional information may be captured, such as a source address, timestamp, etc. In some embodiments, a blockchain may also consist of additional, and in some instances arbitrary, data that is confirmed and validated by the blockchain network through proof of work and/or any other suitable verification techniques associated therewith. In some cases, such data may be included in the blockchain as part of transactions, such as included in additional data appended to transaction data. In some instances, the inclusion of such data in a blockchain may constitute a transaction. In such instances, a blockchain may not be directly associated with a specific digital, virtual, fiat, or other type of currency.

Payment Card—A card or data associated with a transaction account that may be provided to a merchant in order to fund a financial transaction via the associated transaction account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated transaction account (e.g., as stored in a communication device, such as a smart phone or computer). For example, in some instances, data including a payment account number may be considered a payment card for the processing of a transaction funded by the associated transaction account. In some instances, a check may be considered a payment card where applicable.

System for Offline Data Exchanges Associated with a Blockchain

FIG. 1 illustrates a system 100 for the conducting of offline data exchanges for an electronic transaction using a blockchain.

The system 100 may include an integrated circuit card 102. The integrated circuit card 102, discussed in more detail below, may be a payment card that includes an integrated circuit comprised of one or more components configured to perform the functions discussed herein. The integrated circuit card 102 may be, for example, a payment card compliant with the EMV technical standard that is comprised of at least a processing device, memory, and communications unit. As discussed herein, the integrated circuit card 102 may be configured to generate data for use in an offline data exchange with an electronic point of sale device 104, which may be used in the conducting of an electronic transaction via a blockchain.

The electronic point of sale device 104, discussed in more detail below, may be configured to perform functions associated with the conducting and processing of electronic payment transaction as will be apparent to persons having skill in the relevant art. For example, the electronic point of sale device 104 may be configured to store transaction data, read payment details from payment cards, electronically transmit transaction data and payment details to a payment network 106, etc. The electronic transmission of data from the electronic point of sale device 104 may be facilitated via one or more intermediate entities, such as an acquiring financial institution and a gateway processor, which may receive transaction data and payment details from the electronic point of sale device 104, and forward the information on towards the payment network 106, which may include the reformatting or transformation of the data, as applicable.

In a traditional electronic transaction, a consumer may present the integrated circuit card 102 to an employee of a merchant at an electronic point of sale device 104. The electronic point of sale device 104 may read payment details from the integrated circuit card 102 using a suitable method, such as receiving the payment details using near field communication, reading a magnetic stripe included in the integrated circuit card 102 that is encoded with the payment details, reading the payment details from the integrated circuit on the integrated circuit card 102 via communications facilitated using one or more contact points of the integrated circuit card 102 (e.g., such as contacted by the electronic point of sale device 104 via insertion into a reading unit of the electronic point of sale device 104), etc. The payment details may include, for example, a transaction account number, transaction account data (e.g., name, expiration date, etc.), security code, and one or more cryptograms.

The electronic point of sale device 104 may electronically transmit the payment details and transaction data for the electronic transaction to the payment network 106 via one or more intermediate entities using the payment rails associated with the payment network 106. The transaction data may include, for example, a transaction amount, transaction time, transaction date, geographic location, merchant identifier, merchant category code, point of sale identifier, product data, offer data, reward data, loyalty data, etc. The payment network 106 may receive the data and may process the electronic transaction using traditional methods, which may include the exchange of communications between one or more financial institutions associated with the merchant and/or consumer involved in the transaction using the payment rails. An approval or denial of the electronic transaction may be conveyed back to the electronic point of sale device 104 using the payment rails. The employee of the merchant may then finalize the transaction accordingly, such as by providing the purchased goods or services to the consumer upon approval, or informing the consumer of the denial. Additional detail regarding the traditional processing of electronic transactions involving a payment network 106 is discussed in more detail below with respect to the process 900 illustrated in FIG. 9.

Due to the reliance on the payment network 106 to process electronic transactions, in a traditional system, a transaction may be unable to be completed in instances where communication between the payment network 106 and electronic point of sale device 104 may be interrupted or otherwise unavailable, referred to herein as the electronic point of sale device 104 being "offline." In order to facilitate the processing of an electronic transaction with an insufficient connection to the payment network 106, the integrated circuit card 102 and electronic point of sale device 104 may be configured to perform an offline data exchange that utilizes a blockchain in order to successfully process the electronic transaction.

The integrated circuit card 102 may be loaded with one or more structured data sets suitable for use in performing the functions discussed herein. Each structured data set may be associated with a blockchain network 110 suitable for use in the processing of the electronic transaction as an alternative to the payment network 106. Each structured data set may be comprised of a network identifier corresponding to the associated blockchain network 110, an unspent output hash, an output index, an output value, and a key pair. The unspent output hash may be a hash value corresponding to a transaction hash for a blockchain transaction included in the blockchain associated with the respective blockchain network 110. The output index may be an index value indicating the output of the blockchain transaction. The output value may be a value in a blockchain currency associated with the respective blockchain network 110 that was transferred in the blockchain transaction. The key pair may be comprised of a public key and corresponding private key that are associated with the blockchain transaction.

In some embodiments, each structured data set may be loaded onto the integrated circuit card 102 via the payment network 106. In such embodiments, when the integrated circuit card 102 is in communication with the payment network 106, a structured data set suitable for use in an offline data exchange may be loaded onto the integrated circuit card 102 using the payment rails. The integrated circuit card 102 may then have the structured data set available for use in an offline data exchange with an offline electronic point of sale device 104. Additional detail regarding the loading of structured data sets to integrated circuit cards is discussed below with respect to the process illustrated in FIG. 4.

The integrated circuit card 102 and the electronic point of sale device 104 may establish a communication channel whereby the integrated circuit card 102 and electronic point of sale device 104 may exchange electronic data transmissions. In one embodiment, the integrated circuit card 102 and electronic point of sale device 104 may establish a communication channel via near field communication. In another embodiment, the integrated circuit card 102 may be inserted into a reading device of the electronic point of sale device 104 configured to establishing a communication channel with the integrated circuit card 102 via one or more contact points included thereon. Additional methods of communication between the integrated circuit card 102 and the electronic point of sale device 104 may be used in conjunction with the functions discussed herein, such as local area networks, Bluetooth, etc.

The electronic point of sale device 104 may be connected to a blockchain network 110. In some embodiments, the electronic point of sale device 104 may be a node associated with the blockchain network 110 and configured to post blockchain transactions and/or blocks of blockchain transactions to a blockchain associated therewith. In other embodiments, the electronic point of sale device 104 may be configured to electronically communicate with an intermediate computing device 108, which may be a node of the blockchain network 110. Communications between the electronic point of sale device 104 and the blockchain network 110 and/or computing device 108 may be performed using any suitable communication network other than the payment network 106, such as the Internet, such that the electronic point of sale device 104 may be in communication with the computing device 108 and/or blockchain network 110 in instances where the electronic point of sale device 104 is offline with the payment network 106.

When communication between the integrated circuit card 102 and electronic point of sale device 104 are established, the electronic point of sale device 104 may electronically transmit at least a network identifier and transaction value to the integrated circuit card via the established communication channel. The network identifier may be associated with a blockchain network 110 with which the electronic point of sale device 104 is in communication. In some instances, the electronic point of sale device 104 may electronically transmit a plurality of network identifiers, which may include a network identifier for each blockchain network 110 to which the electronic point of sale device 104 has access. In such instances, the electronic point of sale device 104 may process transactions using a plurality of different blockchain networks 110, such as to accommodate different blockchain networks 110 that may be associated with different integrated circuit cards 102 being used. The transaction value may be an amount in a fiat currency for the electronic transaction that is to be paid via the integrated circuit card 102 to the merchant associated with the electronic point of sale device 104.

Once the integrated circuit card 102 has received the network identifier(s) and transaction value, the integrated circuit card 102 may verify that the integrated circuit card 102 has access to sufficient amount of blockchain currency to satisfy the transaction value on a blockchain network 110 corresponding to a received network identifier. The verification may be based on the output values included in the structured data sets stored in the integrated circuit card 102 that are associated with blockchain networks 110 corresponding to the network identifiers received from the electronic point of sale device 104. In instances where more than one blockchain network 110 may be suitable (e.g., the structured data sets associated therewith have sufficient output values), the integrated circuit card 102 or electronic point of sale device 104 may indicate a priority ordering of blockchain networks 110. In some embodiments, the integrated circuit card 102 may be configured to convert the transaction value into a blockchain currency amount for blockchain networks 110 whose associated blockchain currency are not equivalent to the fiat currency used in the electronic transaction.

Once a suitable structured data set is identified, the integrated circuit card 102 may electronically transmit the unspent output hash and output index for the structured data set to the electronic point of sale device 104 using the established communication channel. The electronic point of sale device 104 may then communicate with the blockchain network 110 (e.g., via the computing device 108, if applicable) to retrieve transaction information from the blockchain associated with the blockchain network 110 for the blockchain transaction indicated by the unspent output hash. The electronic point of sale device 104 may verify that the unspent output hash corresponds to a valid blockchain transaction. In some instances, the verification may include verification of the blockchain currency amount transferred in the blockchain transaction as being sufficient to cover the transaction value.

The electronic point of sale device 104 may then generate a destination address. The destination address may be a blockchain address to which blockchain currency is to be transferred to effect payment of the transaction value from the user associated with the integrated circuit card 102 to the merchant associated with the electronic point of sale device 104. The destination address may be generated via the application of one or more hashing algorithms to a public key of a key pair associated with the electronic point of sale device 104. The key pair may comprise the public key and a private key possessed by the electronic point of sale device 104 or a computing system of the associated merchant. Once the blockchain transaction is verified and the destination address is generated, the electronic point of sale device 104 may electronically transmit at least the destination address to the integrated circuit card 102 using the established communication channel. In some instances, the electronic point of sale device 104 may also transmit additional information suitable for use in the electronic transaction, such as data associated with the identified previous blockchain transaction, a merchant identifier, a point of sale device identifier, a processing fee, etc.

The integrated circuit card 102 may then generate a signed blockchain transaction. The blockchain transaction may comprise at least the destination address received from the electronic point of sale device 104 and a payment amount, which may be an amount of blockchain currency corresponding to the transaction value. The blockchain transaction may then be signed using the private key of the key pair stored in the integrated circuit card 102 and a reference associated with the previous blockchain transaction and/or corresponding unspent output hash, which may indicate that the integrated circuit card 102 is authorized to access the blockchain currency made available in the previous blockchain transaction.

In instances where the output value associated with the previous blockchain transaction may be greater than the payment amount for the new blockchain transaction, the integrated circuit card 102 may be configured to generate a remainder address for receipt of the remaining blockchain currency amount (e.g., the output value less the payment amount). In such instances, the integrated circuit card 102 may generate a new key pair comprising a new public key and corresponding private key using a suitable key pair generation algorithm. The integrated circuit card 102 may generate the remainder address via application of one or more hashing algorithms (e.g., the same hashing algorithm(s) used to generate the destination address) to the new public key. The signed blockchain transaction may then also include the destination address and remaining blockchain currency amount to be transferred thereto.

In embodiments where the electronic point of sale device 104 may electronically transmit additional data to the integrated circuit card 102 along with the destination address, the integrated circuit card 102 may be configured to verify or otherwise validate the additional data prior to generating, signing, or transmitting the new blockchain transaction. Verification may include, for example, verifying the merchant or point of sale identifiers as valid based on one or more identifier formatting rules, verifying that the previous blockchain transaction data corresponds to the unspent output hash, etc. In such embodiments, if the verification fails, the integrated circuit card 102 may halt further processing of the electronic transaction, such as by electronically transmitting a notification to that effect to the electronic point of sale device 104 using the established communication channel.

Once the new blockchain transaction has been generated and signed, the integrated circuit card 102 may electronically transmit the signed blockchain transaction to the electronic point of sale device 104 using the established communication channel. The signed blockchain transaction may then be posted to the blockchain network 110 using traditional methods, such as by including the signed transaction in a block of transactions validated and posted to the corresponding blockchain by the electronic point of sale device 104 or other node of the blockchain network 110. Once the transaction has been posted to the blockchain, the merchant will have claim to the transaction value of blockchain currency, while the integrated circuit card 102 will have claim to any remaining amount.

The electronic transaction may then be complete, where the integrated circuit card 102 may be removed from communication with the electronic point of sale device 104. In some instances, the communication may be broken (e.g., by the user associated with the integrated circuit card 102 leaving proximity of the electronic point of sale device 104) prior to the posting of the signed blockchain transaction to the blockchain.

Following completion of the electronic transaction, the integrated circuit card 102 may be configured to establish communication with the payment network 106 to unload a new structured data set. The new structured data set may be generated by the integrated circuit card 102 based on the new blockchain transaction and data generated associated therewith. For instance, the new structured data set may include a network identifier, unspent output hash, output index, output value, and key pair according to the new blockchain transaction. The network identifier may be the identifier associated with the blockchain network 110 to which the new transaction was posted. The unspent output hash may be generated by the integrated circuit card 102 by hashing the signed blockchain transaction. The output index and output values may be based on the new blockchain transaction, such as where the output value corresponds to the remaining blockchain currency amount being transferred to the remainder address. The key pair may be the new key pair generated by the integrated circuit card 102 where the public key is used to generate the remainder address. The new structured data set may then be unloaded to the payment network 106 using the process illustrated in FIG. 6 and discussed in more detail below.

As discussed above, the integrated circuit card 102 and electronic point of sale device 104 may be configured to perform a data exchange for use in processing a blockchain transaction when the electronic point of sale device 104 is offline with the payment network 106. It will be apparent to persons having skill in the relevant art that the methods discussed herein may also be suitable for use in instances where the electronic point of sale device 104 is online with the payment network 106, but where a blockchain network 110 is used as an alternative for processing of the electronic transaction, such as in instances where the integrated circuit card 102 may be unsuitable for use in traditional (e.g., using the payment network 106) processing. For example, a blockchain network 110 may be used for processing if the integrated circuit card 102 does not have access to sufficient fiat currency for traditional processing, but may have access to an output value of sufficient blockchain currency. In such instances, the loading and/or unloading of structured data sets involving the integrated circuit card 102, as discussed below, may be performed using the electronic point of sale device 104 as an intermediary between the integrated circuit card 102 and the payment network 106. For example, once the signed blockchain transaction is electronically transmitted to the electronic point of sale device 104, the integrated circuit card 102 may proceed to unload the new structured data set to the electronic point of sale device 104 for conveyance to the payment network 106 using the payment rails.

The methods and systems discussed herein enable the processing of electronic transactions at an electronic point of sale device 104 that is offline with a payment network 106 via the use of an integrated circuit card 102 in association with a blockchain network 110. As a result, electronic transactions may be conducted even in instances where the electronic point of sale device 104 is offline, and using an integrated circuit card 102 that is also configured for traditional processing via the specialized programming and configuration discussed herein, such that a consumer can use a single integrated circuit card 102 for online and offline transacting. This may result in increased processing of electronic transactions, which may strengthen consumer and merchant relationships, increase consumer convenience, and increase merchant revenue.

Integrated Circuit Card

Figure 2:
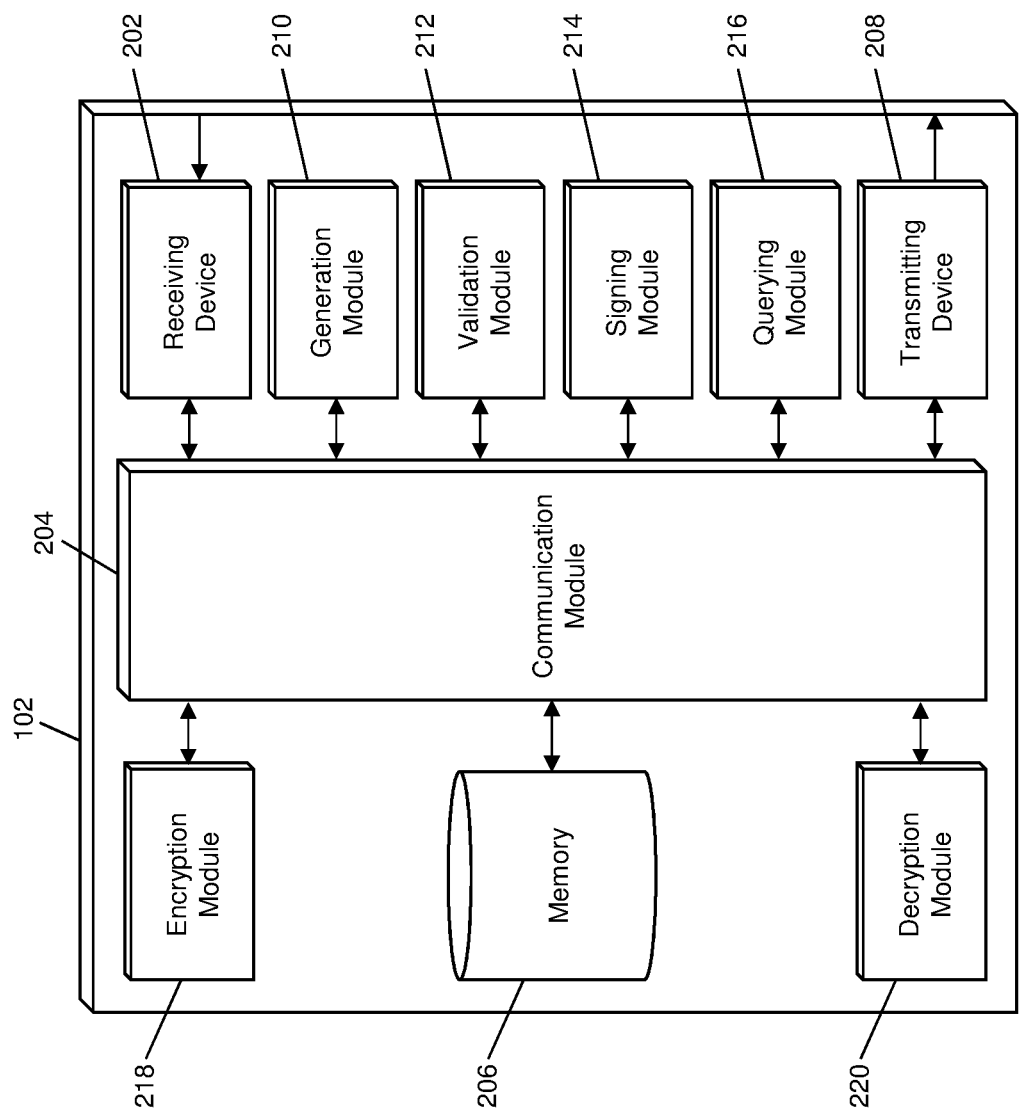
FIG. 2 is a block diagram illustrating the integrated circuit card of FIG. 1 for the offline exchange of data associated with a blockchain for use in an electronic transaction in accordance with exemplary embodiments.

FIG. 2 illustrates an embodiment of the integrated circuit card 102 of the system 100. It will be apparent to persons having skill in the relevant art that the embodiment of the integrated circuit card 102 illustrated in FIG. 2 is provided as illustration only and may not be exhaustive to all possible configurations of the integrated circuit card 102 suitable for performing the functions as discussed herein. For example, the computer system 1000 illustrated in FIG. 10 and discussed in more detail below may be a suitable configuration of the integrated circuit card 102.

The integrated circuit card 102 may include a receiving device 202. The receiving device 202 may be configured to receive data over one or more networks via one or more network protocols. In some embodiments, the receiving device 202 may be configured to receive data over the payment rails, such as using specially configured infrastructure associated with payment networks 106 for the transmission of transaction messages that include sensitive financial data and information. In some instances, the receiving device 202 may also be configured to receive data from electronic point of sale devices 104, payment networks 106, computing devices 108, blockchain networks 110, and other entities via alternative networks, such as the Internet. In some embodiments, the receiving device 202 may be comprised of multiple devices, such as different receiving devices for receiving data over different networks, such as a first receiving device for receiving data over payment rails and a second receiving device for receiving data over the Internet. The receiving device 202 may receive electronically data signals that are transmitted, where data may be superimposed on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by the electronic point of sale device 104 using an established communication channel. The data signals may be superimposed with data suitable for use in performing the functions of the integrated circuit card 102 discussed herein. For example, the data signals may be superimposed with network identifiers, transaction values, blockchain transaction data, destination addresses, merchant identifiers, device identifiers, processing fees, etc. The receiving device 202 may also be configured to receive data signals electronically transmitted by the payment network 106 using the payment rails or a suitable alternative communication network. In some instances, such data signals may be received by the receiving device 202 via one or more intermediate computing devices, such as the electronic point of sale device 104 or other suitable device, such as an automated teller machine. The data signals may be superimposed with encrypted payloads, which may be encrypted structured data sets used in offline data exchanges.

The integrated circuit card 102 may also include a communication module 204. The communication module 204 may be configured to transmit data between modules, engines, databases, memories, and other components of the integrated circuit card 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the integrated circuit card 102 and external components of the integrated circuit card 102, such as externally connected databases, display devices, input devices, etc., as well as being configured to establish communication channels with outside systems and devices, such as the electronic point of sale device 104. The integrated circuit card 102 may also include a processing device. The processing device may be configured to perform the functions of the integrated circuit card 102 discussed herein as will be apparent to persons having skill in the relevant art. In some embodiments, the processing device may include and/or be comprised of a plurality of engines and/or modules specially configured to perform one or more functions of the processing device, such as a generation module 210, validation module 212, signing module 214, querying module 216, encryption module 218, decryption module 220, etc. As used herein, the term "module" may be software or hardware particularly programmed to receive an input, perform one or more processes using the input, and provide an output. The input, output, and processes performed by various modules will be apparent to one skilled in the art based upon the present disclosure.

The integrated circuit card 102 may include a memory 206. The memory 206 may be configured to store data for use by the integrated circuit card 102 in performing the functions discussed herein. The memory 206 may be configured to store data using suitable data formatting methods and schema and may be any suitable type of memory, such as read-only memory, random access memory, etc. The memory 206 may include, for example, encryption keys and algorithms, communication protocols and standards, data formatting standards and protocols, program code for modules and application programs of the processing device, and other data that may be suitable for use by the integrated circuit card 102 in the performance of the functions disclosed herein as will be apparent to persons having skill in the relevant art. The memory 206 may also include or be comprised of a relational database that utilizes structured query language for the storage, identification, modifying, updating, accessing, etc. of structured data sets stored therein.

The memory 206 may be configured to store one or more structured data sets. Each structured data set may be associated with a blockchain network 110 and may be loaded onto the integrated circuit card 102 using processes involving the payment network 106 discussed in more detail below. Each structured data set may include at least a network identifier, unspent output hash, output index, output value, and a key pair. The network identifier may be a unique value corresponding to the associated blockchain network 110 suitable for the identification thereof. The unspent output hash may be a hash of a previous blockchain transaction, where the output index and output value may include data associated therewith, such as the output value being an amount of blockchain currency accessible by the integrated circuit card 102 via the previous blockchain transaction. The key pair may comprise a public key and corresponding private key, which may be used in the access of the output value of blockchain currency in a future transaction.

The integrated circuit card 102 may include a generation module 210. The generation module 210 may be configured to receive instructions to generate data as input, may generate the requested data, and may output the requested data to one or more additional modules or engines of the integrated circuit card 102. In some instances, the instructions may be accompanied by additional data for use in performing the data generation. For example, the generation module 210 may be configured to generate a blockchain transaction, which may utilize data received by the receiving device 202 (e.g., from the electronic point of sale device 104) as well as data stored in the memory 206 (e.g., a structured data set). The generation module 210 may also be configured to generate key pairs using suitable key pair generation algorithms (e.g., stored in the memory 206), and may also be configured to generate new structured data sets. The generation module 210 may also be used in the generation of addresses for use in blockchain transactions, such as via the application of one or more hashing algorithms (e.g., stored in the memory 206) to a public key, such as one generated by the generation module 210 and/or stored in a structured data set.

The integrated circuit card 102 may also include a validation module 212. The validation module 212 may be configured to receive multiple pieces of data, may validate the received data, and may output an indication of success or failure of the validation to one or more additional modules or engines of the integrated circuit card 102. For example, the validation module 212 may be configured to validate that the output value included in a structured data set stored in the memory 206 is sufficient (e.g., greater than or equal to) to cover a transaction value for an electronic transaction received by the receiving device 202 from the electronic point of sale device 104. The validation module 212 may also be configured to validate data received from the electronic point of sale device 104 used in the generation of a new blockchain transaction, such as by validating that previous blockchain transaction data matches the unspent output hash included in the structured data set being used in the electronic transaction.

The integrated circuit card 102 may also include a signing module 214. The signing module 214 may be configured to receive data, may sign the data, and may output the signed data to one or more additional modules or engines of the integrated circuit card 102. For example, the signing module 214 may be configured to receive and sign blockchain transactions. The signing module 214 may sign blockchain transactions using a private key included in a key pair included in a structured data set being used in an electronic transaction. The signing of a blockchain transaction may include execution of one or more scripts using the private key, which may also incorporate the unspent output hash included in the structured data set or associated previous blockchain transaction data received from the electronic point of sale device 104.

The integrated circuit card 102 may also include a querying module 216. The querying module 216 may be configured to execute queries on databases to identify information. The querying module 216 may receive one or more data values or query strings, and may execute a query string based thereon on an indicated database, such as the memory 206, to identify information stored therein. The querying module 216 may then output the identified information to an appropriate engine or module of the integrated circuit card 102 as necessary. The querying module 216 may, for example, execute a query on the memory 206 to identify a structured data set. For instance, when a network identifier is received from the electronic point of sale device 104, the querying module 216 may execute a query on the memory 206 to identify a structured data set where the included network identifier matches the network identifier received from the electronic point of sale device 104.

The integrated circuit card 102 may also include an encryption module 218. The encryption module 218 may be configured to receive data, encrypt the data, and then output the encrypted data to one or more additional modules or engines of the integrated circuit card 102. The encryption module 218 may utilize one or more encryption algorithms, which may be stored in the memory 206, and may be indicated in instructions accompanying the data to be encrypted or may be identified by the encryption module 218. The encryption module 218 may be configured to encrypt, for example, a structured data set for unloading to the payment network 106. The encryption may use one or more encryption algorithms that may be known to the payment network 106 and/or using one or more encryption keys that may also be known by the payment network 106 such that the payment network 106 may be able to decrypt the encrypted structured data set.

The integrated circuit card 102 may also include a decryption module 220. The decryption module 220 may be configured to receive encrypt data, decrypt the data, and then output the decrypted data to one or more additional modules or engines of the integrated circuit card 102. The decryption module 220 may utilize one or more encryption and/or decryption algorithms, which may be stored in the memory 206, and may be indicated in instructions accompanying the data to be decrypted or may be identified by the decryption module 220. The decryption module 220 may be configured to decrypt, for example, a payload received from the payment network 106 that includes an encrypted structured data set, which may be decrypted and stored in the memory 206 and used in a later offline data exchange. The decryption may use the one or more encryption and/or decryption algorithms and/or one or more encryption keys that may also be known by the payment network 106 such that the encryption performed by the payment network 106 can be suitably decrypted via the decryption module 220.

The integrated circuit card 102 may also include a transmitting device 208. The transmitting device 208 may be configured to transmit data over one or more networks via one or more network protocols. In some embodiments, the transmitting device 208 may be configured to transmit data over the payment rails, such as using specially configured infrastructure associated with payment networks 106 for the transmission of transaction messages that include sensitive financial data and information, such as identified payment credentials. In some instances, the transmitting device 208 may be configured to transmit data to electronic point of sale devices 104, payment networks 106, computing devices 108, blockchain networks 110, and other entities via alternative networks, such as the Internet. In some embodiments, the transmitting device 208 may be comprised of multiple devices, such as different transmitting devices for transmitting data over different networks, such as a first transmitting device for transmitting data over the payment rails and a second transmitting device for transmitting data over the Internet. The transmitting device 208 may electronically transmit data signals that have data superimposed that may be parsed by a receiving computing device. In some instances, the transmitting device 208 may include one or more modules for superimposing, encoding, or otherwise formatting data into data signals suitable for transmission.

The transmitting device 208 may be configured to electronically transmit data signals to the electronic point of sale device 104 using an established communication channel. The data signals may be superimposed with data suitable for use in performing the functions of the integrated circuit card 102 discussed herein, such as unspent transaction hashes and output indices, signed blockchain transactions, etc. The transmitting device 208 may also be configured to electronically transmit data signals to the payment network 106, which may be forwarded through one or more intermediate devices or systems, such as the electronic point of sale device 104. Data signals transmitted to the payment network 106 may be superimposed with data suitable for use in performing the functions of the integrated circuit card 102 discussed herein, such as encrypted structured data sets.

Electronic Point of Sale Device

Figure 3:
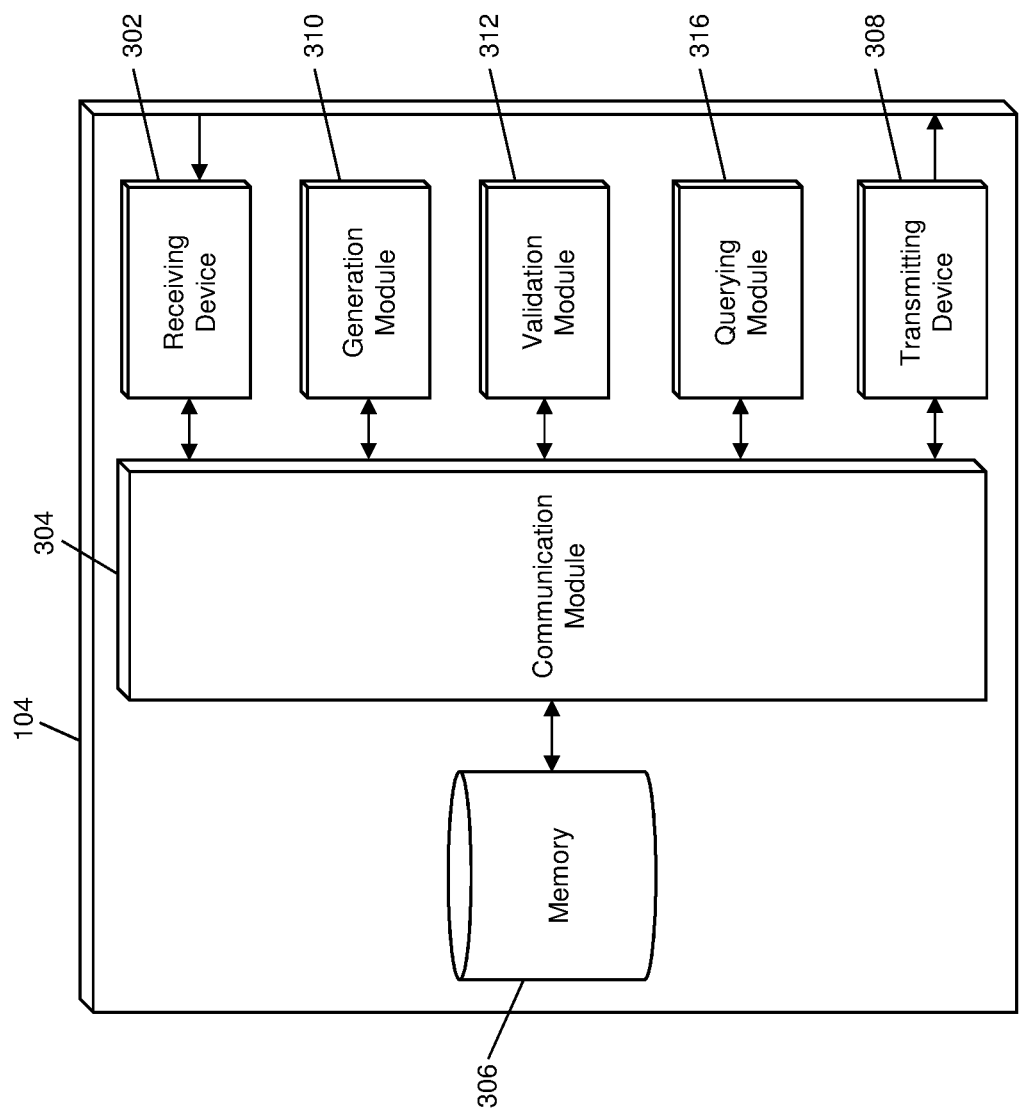
FIG. 3 is a block diagram illustrating the electronic point of sale device of FIG. 1 for the offline exchange of data associated with a blockchain for use in an electronic transaction in accordance with exemplary embodiments.

FIG. 3 illustrates an embodiment of the electronic point of sale device 104 of the system 100. It will be apparent to persons having skill in the relevant art that the embodiment of the electronic point of sale device 104 illustrated in FIG. 3 is provided as illustration only and may not be exhaustive to all possible configurations of the electronic point of sale device 104 suitable for performing the functions as discussed herein. For example, the computer system 1000 illustrated in FIG. 10 and discussed in more detail below may be a suitable configuration of the electronic point of sale device 104.

The electronic point of sale device 104 may include a receiving device 302. The receiving device 302 may be configured to receive data over one or more networks via one or more network protocols. In some embodiments, the receiving device 302 may be configured to receive data over the payment rails, such as using specially configured infrastructure associated with payment networks 106 for the transmission of transaction messages that include sensitive financial data and information. In some instances, the receiving device 302 may also be configured to receive data from integrated circuit cards 102, payment networks 106, computing devices 108, blockchain networks 110, and other entities via alternative networks, such as the Internet. In some embodiments, the receiving device 302 may be comprised of multiple devices, such as different receiving devices for receiving data over different networks, such as a first receiving device for receiving data over payment rails and a second receiving device for receiving data over the Internet. The receiving device 302 may receive electronically data signals that are transmitted, where data may be superimposed on the data signal and decoded, parsed, read, or otherwise obtained via receipt of the data signal by the receiving device 302. In some instances, the receiving device 302 may include a parsing module for parsing the received data signal to obtain the data superimposed thereon. For example, the receiving device 302 may include a parser program configured to receive and transform the received data signal into usable input for the functions performed by the processing device to carry out the methods and systems described herein.

The receiving device 302 may be configured to receive data signals electronically transmitted by the integrated circuit card 102 using an established communication channel. The data signals may be superimposed with data suitable for use in performing the functions of the electronic point of sale device 104 discussed herein. For example, the data signals may be superimposed with unspent transaction hashes, output indices, signed blockchain transactions, etc. The receiving device 302 may also be configured to receive data signals electronically transmitted by the payment network 106 using the payment rails or a suitable alternative communication network, as well as data signals electronically transmitted by the blockchain network 110 using a suitable communication network. In some instances, such data signals may be received by the receiving device 302 via one or more intermediate computing devices, such as the computing device 108 when receiving data from the blockchain network 110. In some cases, the receiving device 302 may receive data from the payment network 106 to be forwarded on to the integrated circuit card 102.

The electronic point of sale device 104 may also include a communication module 304. The communication module 304 may be configured to transmit data between modules, engines, databases, memories, and other components of the electronic point of sale device 104 for use in performing the functions discussed herein. The communication module 304 may be comprised of one or more communication types and utilize various communication methods for communications within a computing device. For example, the communication module 304 may be comprised of a bus, contact pin connectors, wires, etc. In some embodiments, the communication module 304 may also be configured to communicate between internal components of the electronic point of sale device 104 and external components of the electronic point of sale device 104, such as externally connected databases, display devices, input devices, etc., as well as being configured to establish communication channels with outside systems and devices, such as the integrated circuit card 102. The electronic point of sale device 104 may also include a processing device. The processing device may be configured to perform the functions of the electronic point of sale device 104 discussed herein as will be apparent to persons having skill in the relevant art. In some embodiments, the processing device may include and/or be comprised of a plurality of engines and/or modules specially configured to perform one or more functions of the processing device, such as a generation module 310, validation module 312, querying module 316, etc. As used herein, the term "module" may be software or hardware particularly programmed to receive an input, perform one or more processes using the input, and provide an output. The input, output, and processes performed by various modules will be apparent to one skilled in the art based upon the present disclosure.

The electronic point of sale device 104 may include a memory 306. The memory 306 may be configured to store data for use by the electronic point of sale device 104 in performing the functions discussed herein. The memory 306 may be configured to store data using suitable data formatting methods and schema and may be any suitable type of memory, such as read-only memory, random access memory, etc. The memory 306 may include, for example, encryption keys and algorithms, communication protocols and standards, data formatting standards and protocols, program code for modules and application programs of the processing device, and other data that may be suitable for use by the electronic point of sale device 104 in the performance of the functions disclosed herein as will be apparent to persons having skill in the relevant art. The memory 306 may also include or be comprised of a relational database that utilizes structured query language for the storage, identification, modifying, updating, accessing, etc. of structured data sets stored therein. The memory 306 may be configured to store network identifiers associated with blockchain networks 110 with whom the electronic point of sale device 104 can process blockchain transactions, a key pair comprising a public key and private key used to generate destination addresses, and transaction data associated with the electronic transaction, such as a transaction value.

The electronic point of sale device 104 may include a generation module 310. The generation module 310 may be configured to receive instructions to generate data as input, may generate the requested data, and may output the requested data to one or more additional modules or engines of the electronic point of sale device 104. In some instances, the instructions may be accompanied by additional data for use in performing the data generation. For example, the generation module 310 may be configured to generate destination addresses for blockchain transactions. Destination addresses may be generated via the application of one or more hashing algorithms to a public key stored in the memory 306. The generation module 310 may also be configured to generate data signals for transmission to external devices and systems, such as generating a data signal comprising the destination address and other data to the integrated circuit card 102.

The electronic point of sale device 104 may also include a validation module 312. The validation module 312 may be configured to receive multiple pieces of data, may validate the received data, and may output an indication of success or failure of the validation to one or more additional modules or engines of the electronic point of sale device 104. For example, the validation module 312 may be configured to validate that a received unspent output hash corresponds to a genuine previous blockchain transaction in the blockchain corresponding to a network identifier stored in the memory 306. In some instances, the validation module 312 may also validate the output value for the corresponding previous blockchain transaction as being sufficient to cover the transaction value for the current electronic transaction.

The electronic point of sale device 104 may also include a querying module 316. The querying module 316 may be configured to execute queries on databases to identify information. The querying module 316 may receive one or more data values or query strings, and may execute a query string based thereon on an indicated database, such as the memory 306, to identify information stored therein. The querying module 316 may then output the identified information to an appropriate engine or module of the electronic point of sale device 104 as necessary. The querying module 316 may, for example, execute a query on the memory 306 to identify a transaction value for providing to the integrated circuit card 102, to identify hashing algorithms used to generate a destination address, to identify a public key used to generate a destination address, network identifiers and the selection thereof for selection of a blockchain network 110 to use for processing, etc.

The electronic point of sale device 104 may also include a transmitting device 308. The transmitting device 308 may be configured to transmit data over one or more networks via one or more network protocols. In some embodiments, the transmitting device 308 may be configured to transmit data over the payment rails, such as using specially configured infrastructure associated with payment networks 106 for the transmission of transaction messages that include sensitive financial data and information, such as identified payment credentials. In some instances, the transmitting device 308 may be configured to transmit data to integrated circuit cards 102, payment networks 106, computing devices 108, blockchain networks 110, and other entities via alternative networks, such as the Internet. In some embodiments, the transmitting device 308 may be comprised of multiple devices, such as different transmitting devices for transmitting data over different networks, such as a first transmitting device for transmitting data over the payment rails and a second transmitting device for transmitting data over the Internet. The transmitting device 308 may electronically transmit data signals that have data superimposed that may be parsed by a receiving computing device. In some instances, the transmitting device 308 may include one or more modules for superimposing, encoding, or otherwise formatting data into data signals suitable for transmission.

The transmitting device 308 may be configured to electronically transmit data signals to the integrated circuit card 102 using an established communication channel. The data signals may be superimposed with data suitable for use in performing the functions of the electronic point of sale device 104 and/or integrated circuit card 102 discussed herein, such as network identifiers and transaction values, destination addresses and prior blockchain transaction data, etc. The transmitting device 308 may also be configured to electronically transmit data signals to the payment network 106, which may be forwarded through the electronic point of sale device 104, such as encrypted payloads being transmitted from the integrated circuit card 102 to the payment network 106 using the electronic point of sale device 104 as an intermediary. The transmitting device 308 may also be configured to transmit data signals to blockchain networks 110. The data signals may be superimposed with signed blockchain transactions received from the integrated circuit card 102, and may be directly transmitted to the blockchain network 110 or transmitted to a computing device 108 as an intermediary.

In some embodiments, the transmitting device 308 may be configured to transmit blocks of blockchain transactions to blockchain networks 110 for inclusion in an associated blockchain. In such an embodiment, the electronic point of sale device 104 may operate as a node of the blockchain network 110 and may be configured to aggregate signed blockchain transactions in a block that is validated and posted to the blockchain using traditional methods.

It will be apparent to persons having skill in the relevant art that the components of the electronic point of sale device 104 may also be further configured to perform additional functions associated with traditional processing of payment transactions using the payment network 106. In such instances, the electronic point of sale device 104 may include additional components and/or the components illustrated in FIG. 3 and discussed herein may be configured to perform additional functions sufficient in the traditional processing of electronic transactions using a payment network 106 as will be apparent to persons having skill in the relevant art.

Process for Loading Structured Data Sets

Figure 4:
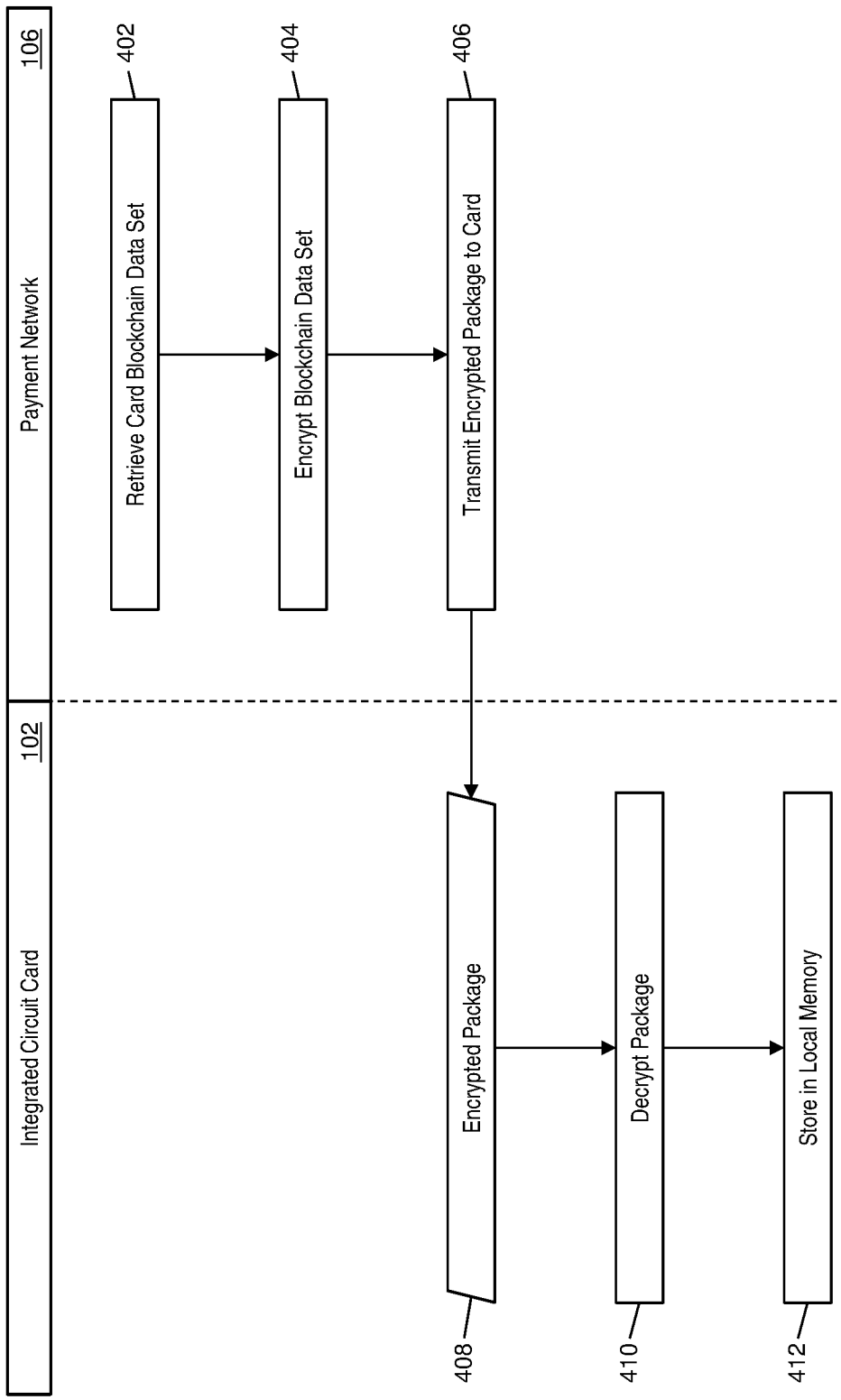
FIG. 4 is a flow diagram illustrating a process for loading a structured data set on an integrated circuit card suitable for use in an offline data exchange in accordance with exemplary embodiments.

FIG. 4 illustrates a process for the loading of a structured data set on the integrated circuit card 102 for use in an offline data exchange with an electronic point of sale device 104 for processing a blockchain transaction without use of the payment network 106.

In step 402, the payment network 106 may retrieve a card blockchain data set. The card blockchain data set may be stored in data storage local to the payment network 106 or external to the payment network 106 and accessible via a suitable communication network, such as via the payment rails, a local area network, etc. The card blockchain data set may be a structured data set comprising of a network identifier, unspent output hash, output index, output value, and key pair. In some instances, the card blockchain data set may have been previously received by the payment network 106 from an integrated circuit card 102 via an unloading process as discussed below.

In step 404, the payment network 106 may encrypt the blockchain data set. The blockchain data set may be encrypted via the use of one or more encryption algorithms, which may utilize one or more encryption keys. In some instances, encryption algorithms and/or keys used may be specific to the integrated circuit card 102 on which the structured data set is being loaded. In step 406, the payment network 106 may electronically transmit a data signal superimposed with the encrypted package to the integrated circuit card 102. In some embodiments, the data signal may be directly transmitted from the payment network 106 to the integrated circuit card 102 using the payment rails. In other embodiments, one or more intermediate devices and/or systems may be used, such as the electronic point of sale device 104 or an automated teller machine. In such embodiments, the payment network 106 may electronically transmit the data signal to the intermediate device or system via the payment rails, while the data signal may be forwarded by the intermediate device or system to the integrated circuit card 102 using the payment rails or an alternative communication method.

In step 408, the receiving device 202 of the integrated circuit card 102 may receive the encrypted package. In step 410, the decryption module 220 of the integrated circuit card 102 may decrypt the package using the same one or more encryption algorithms or corresponding decryption algorithms and encryption keys or corresponding decryption keys used by the payment network 106 to encrypt the package. The decryption may result in the yield of the structured data set, which, in step 412, may be stored in the memory 206 of the integrated circuit card 102. In some instances, storage of the structured data set may include the execution of a query by the querying module 216 of the integrated circuit card 102 on the memory 206 for storage of the structured data set therein.

Process for an Offline Data Exchange Associated with a Blockchain

Figure 5A:
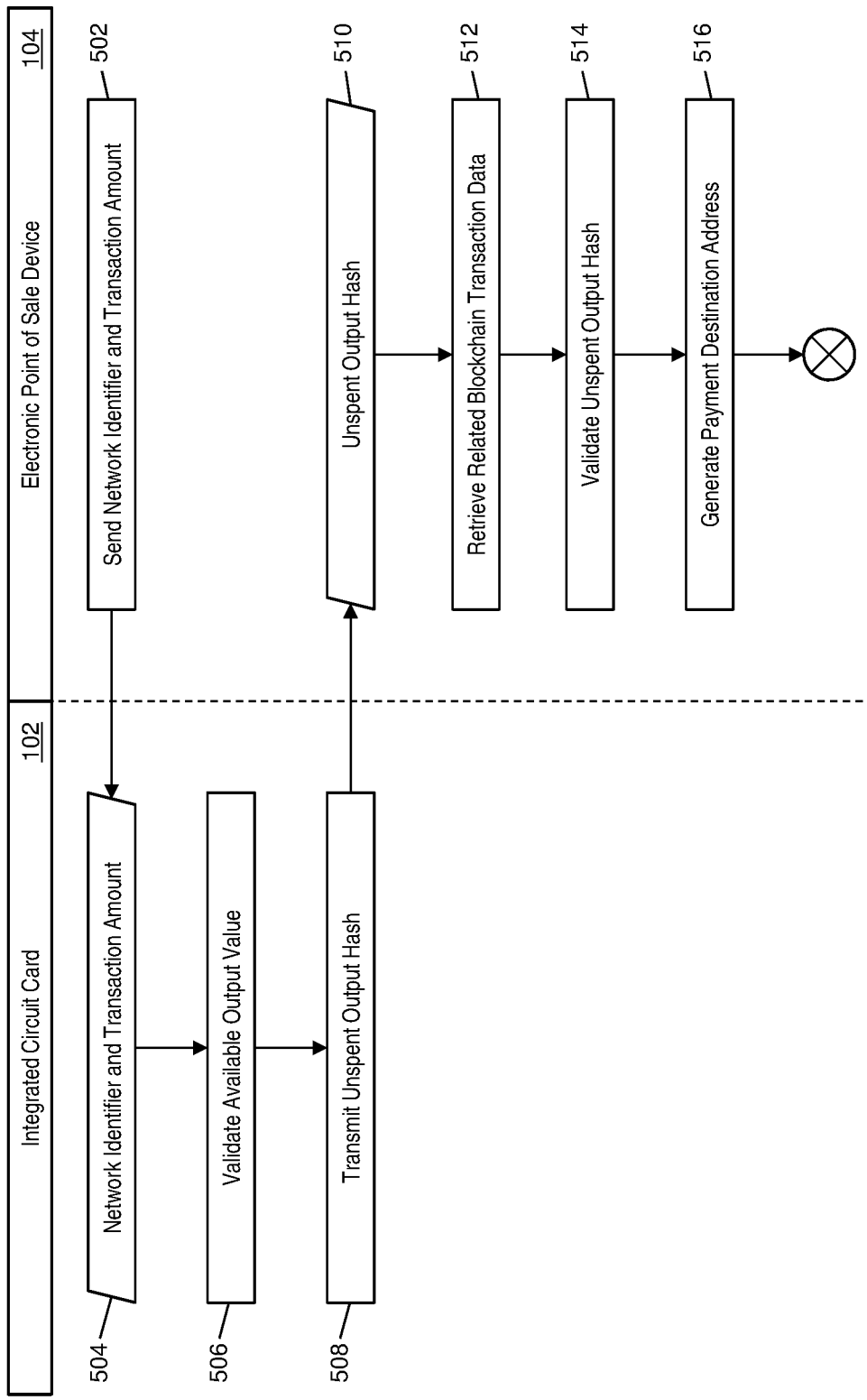
FIGS. 5A and 5B are a flow diagram illustrating a process for conducting an offline data exchange associated with a blockchain for an electronic transaction in accordance with exemplary embodiments.
Figure 5B:
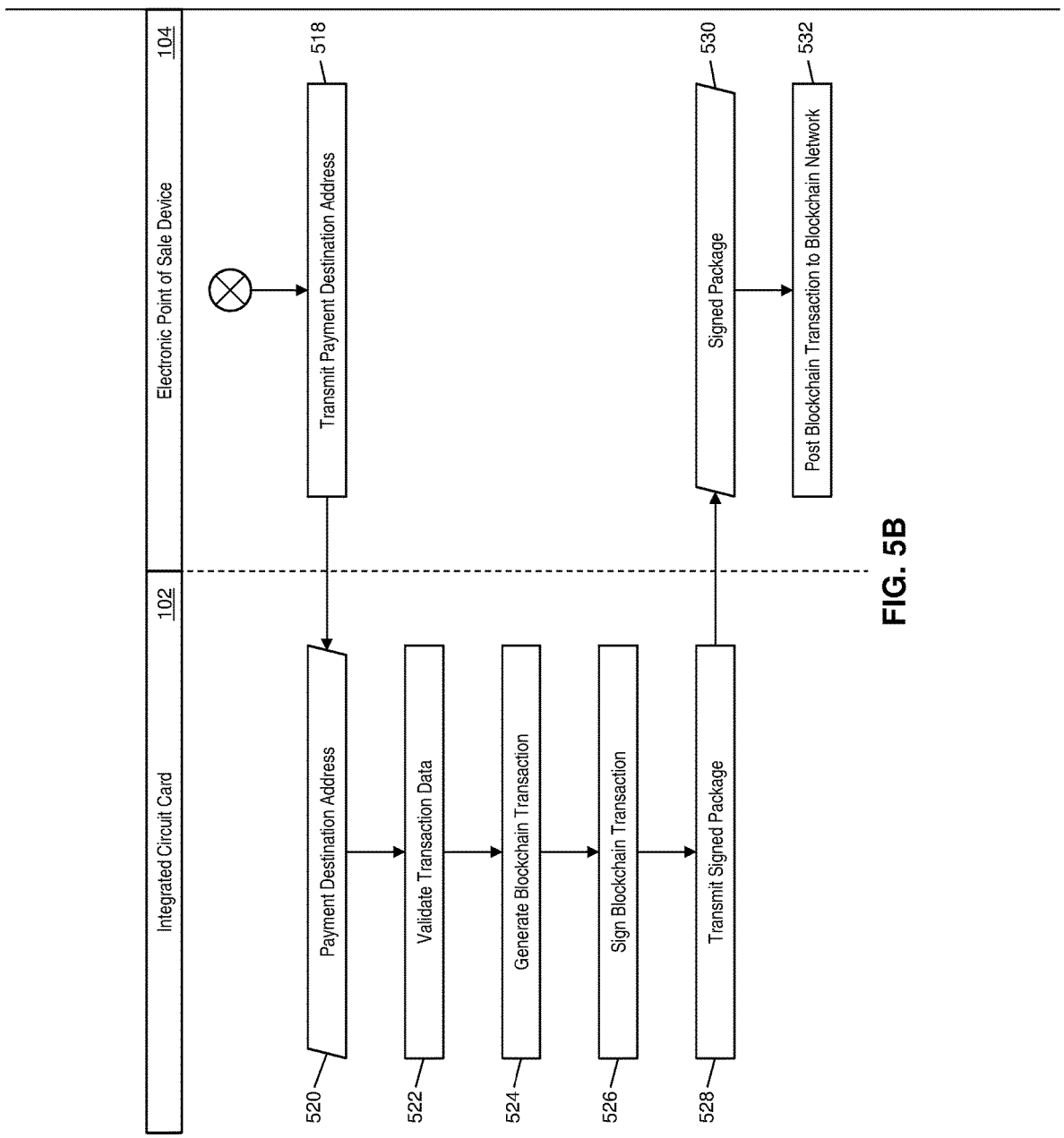

FIGS. 5A and 5B illustrate a process for an offline data exchange between the integrated circuit card 102 and the electronic point of sale device 104 for use in the offline processing of an electronic transaction using a blockchain network 110.

In step 502, the transmitting device 308 of the electronic point of sale device 104 may electronically transmit a data signal to the integrated circuit card 102 using an established communication channel, where the data signal is superimposed with a network identifier and transaction amount. In some instances, the data signal may be superimposed with a plurality of network identifiers, such as network identifiers corresponding to each blockchain network 110 the electronic point of sale device 104 may be configured to post transactions to. In step 504, the receiving device 202 of the integrated circuit card 102 may receive the data signal.

In step 506, the validation module 212 of the integrated circuit card 102 may validate that a sufficient amount of blockchain currency is available on a suitable blockchain network 110 to cover the transaction amount for the transaction. The validation may include identifying (e.g., via execution of a query by the querying module 216 on the memory 206 of the integrated circuit card 102) structured data sets stored in the integrated circuit card 102 that include a network identifier received from the electronic point of sale device 104 and comparing the output value included therein to the transaction amount. In instances where multiple network identifiers may be provided, the validation module 212 may validation if any corresponding structured data set includes a sufficient output value. If multiple structured data sets are validated as sufficient, then a module or engine of the integrated circuit card 102 may select one structured data set for use, such as based on a priority provided by the electronic point of sale device 104 or stored in the memory 206 of the integrated circuit card 102.

Once the selection and validation of a structured data set is successful, then, in step 508, the transmitting device 208 of the integrated circuit card 102 may electronically transmit a data signal superimposed with the unspent output hash and output index to the electronic point of sale device 104 using the established communication channel. In step 510, the receiving device 302 of the electronic point of sale device 104 may receive the data signal. In step 512, the electronic point of sale device 104 may retrieve blockchain transaction data related to the unspent output hash. The retrieval of the blockchain transaction data may include transmitting (e.g., the transmitting device 308) a request to the computing device 108 and/or blockchain network 110 and receiving the blockchain and identifying, in the blockchain, a previous blockchain transaction that corresponds to the unspent output hash. In instances where the electronic point of sale device 104 may be a node for the blockchain network 110, the querying module 316 of the electronic point of sale device 104 may execute a query on the memory 306 to identify the previous blockchain transaction in a blockchain stored therein.

In step 514, the validation module 312 of the electronic point of sale device 104 may validate the unspent output hash as being genuine for a previous blockchain transaction based on a match of the hash to a hash of the identified previous blockchain transaction. In some embodiments, the validation may include validation of the sufficiency of a blockchain currency amount transferred in the previous blockchain transaction. In step 516, the generation module 310 of the electronic point of sale device 104 may generate a destination address for the new blockchain transaction to be processed in the electronic transaction. The destination address may be generated via the application of one or more hashing algorithms (e.g., stored in the memory 306) to a public key of a key pair associated with the electronic point of sale device 104 (e.g., also stored in the memory 306). The destination address may be an address suitable for use in the receipt of blockchain currency in the blockchain associated with the blockchain network 110.

In step 518, the transmitting device 308 of the electronic point of sale device 104 may electronically transmit a data signal superimposed with at least the destination address to the integrated circuit card 102 using the established communication channel. In some instances, the data signal may also be superimposed with the previous blockchain transaction data identified by the electronic point of sale device 104 and additional data that may be suitable for use in validation of the electronic transaction, such as a merchant identifier or point of sale identifier. In step 520, the receiving device 202 of the integrated circuit card 102 may receive the data signal.

In step 522, the validation module 212 of the integrated circuit card 102 may validate the previous blockchain transaction data received from the electronic point of sale device 104. Validation of the previous blockchain transaction data may include validation that the previous blockchain transaction data matches the unspent output hash, which may include the hashing of the previous blockchain transaction data by the generation module 210 or other suitable module or engine of the integrated circuit card 102. Once the transaction is validated, then, in step 524, a new blockchain transaction may be generated by the generation module 210. In some embodiments, the integrated circuit card 102 may perform authentication prior to generation of the blockchain transaction. Authentication may include authentication by a personal identification number entered by the consumer, biometric information supplied by the consumer, or other suitable authentication method as will be apparent to persons having skill in the relevant art.

The new blockchain transaction may include the destination address and transaction amount to be transferred thereto when the new blockchain transaction is processed. In instances where the output value included in the structured data set (e.g., corresponding to the amount transferred in the previous blockchain transaction) is greater than the transaction amount, the new blockchain transaction may also include a remainder address and remainder amount. The remainder address may be generated by the generation module 210 of the integrated circuit card 102 using a new public key generated as part of a new key pair via application of one or more hashing algorithms to the new public key. The remainder amount may be the difference between the output value and the transaction amount being paid to the merchant.

In step 526, the signing module 214 of the integrated circuit card 102 may sign the new blockchain transaction. The new blockchain transaction may be signed using the private key stored in the structured data set, and may also be signed via the execution of one or more scripts associated with the previous blockchain transaction. In such an instance, the script may be stored in the structured data set, or may be identified in the previous blockchain transaction data provided by the electronic point of sale device 104 and received by the receiving device 202 in step 520.

Once the new blockchain transaction has been signed, then, in step 528, the transmitting device 208 of the integrated circuit card 102 may electronically transmit a data signal superimposed with the signed blockchain transaction to the electronic point of sale device 104 using the established communication channel. In step 530, the receiving device 302 of the electronic point of sale device 104 may receive the signed blockchain transaction. In step 532, the signed blockchain transaction may be posted to the blockchain network 110. In instances where the electronic point of sale device 104 is a node in the blockchain network 110, step 532 may include the aggregation of the signed blockchain transaction with other blockchain transactions in a block, which may be validated by the validation module 312 of the electronic point of sale device 104 and then submitted to the blockchain by the transmitting device 308 of the electronic point of sale device 104. In other instances, step 532 may include electronically transmitting a data signal superimposed with the signed blockchain transaction to a computing device 108 associated with the blockchain network 110 by the transmitting device 308 of the electronic point of sale device 104.

Process for Unloading Structured Data Sets

FIG. 6 illustrates a process for unloading a structured data set generated in response to an offline data exchange to a payment network 106 for use in a future offline data exchange for a later electronic transaction.

In step 602, the generation module 210 of the integrated circuit card 102 may generate a new blockchain data set following an offline data exchange for an electronic transaction, such as the offline data exchange illustrated in FIGS. 5A and 5B, discussed above. The new blockchain data set may be generated in instances where a remainder address was generated for the electronic transaction as a structured data set that includes data associated with the corresponding blockchain transaction for use of the remainder in the blockchain transaction. The new blockchain data set may include the network identifier associated with the blockchain network 110, an unspent output hash, output index, and output value for the blockchain transaction, and a key pair previously generated by the generation module 210 for use of the corresponding public key in generating the remainder address.

In step 604, the querying module 216 of the integrated circuit card 102 may execute a query to replace the structured data set used in the new blockchain transaction with the newly generated blockchain data set. The previous structured data set may be replaced due to the inability to use the blockchain currency associated with that structured data set due to the new blockchain transaction having transferred the currency to the destination and remainder addresses. In step 606, the encryption module 218 of the integrated circuit card 102 may encrypt the new blockchain data set using one or more encryption keys and one or encryption algorithms, which may be stored in the memory 206 of the integrated circuit card 102.

In step 608, the transmitting device 208 of the integrated circuit card 102 may electronically transmit a data signal superimposed with the encrypted new blockchain data set to the payment network 106. In some instances, the data signal may be electronically transmitted directly to the payment network 106 via the payment rails. In other instances, the data signal may be transmitted via one or more intermediate entities, such as the electronic point of sale device 104, and may be transmitted to the intermediate entity using a suitable communication network, which may then forward the data signal to the payment network 106 using the payment rails. Once the encrypted package has been transmitted, then, in step 610, the querying module 216 of the integrated circuit card 102 may execute a query on the memory 206 to delete the new blockchain data set. In such instances, the integrated circuit card 102 may be unavailable for use in a blockchain transaction until a new structured data set is loaded, such as using the process illustrated in FIG. 4.

In step 612, a receiving device of the payment network 106 may receive the encrypted package. In step 614, the payment network 106 may decrypt the package to obtain the new blockchain data set using the encryption keys and algorithms used by the encryption module 218 of the integrated circuit card 102 or corresponding decryption keys and algorithms. In step 616, the payment network 106 may store the new blockchain data set, which may be retrieved later on for loading on an integrated circuit card 102 for use in an offline data exchange for a future electronic transaction.

Figure 7:
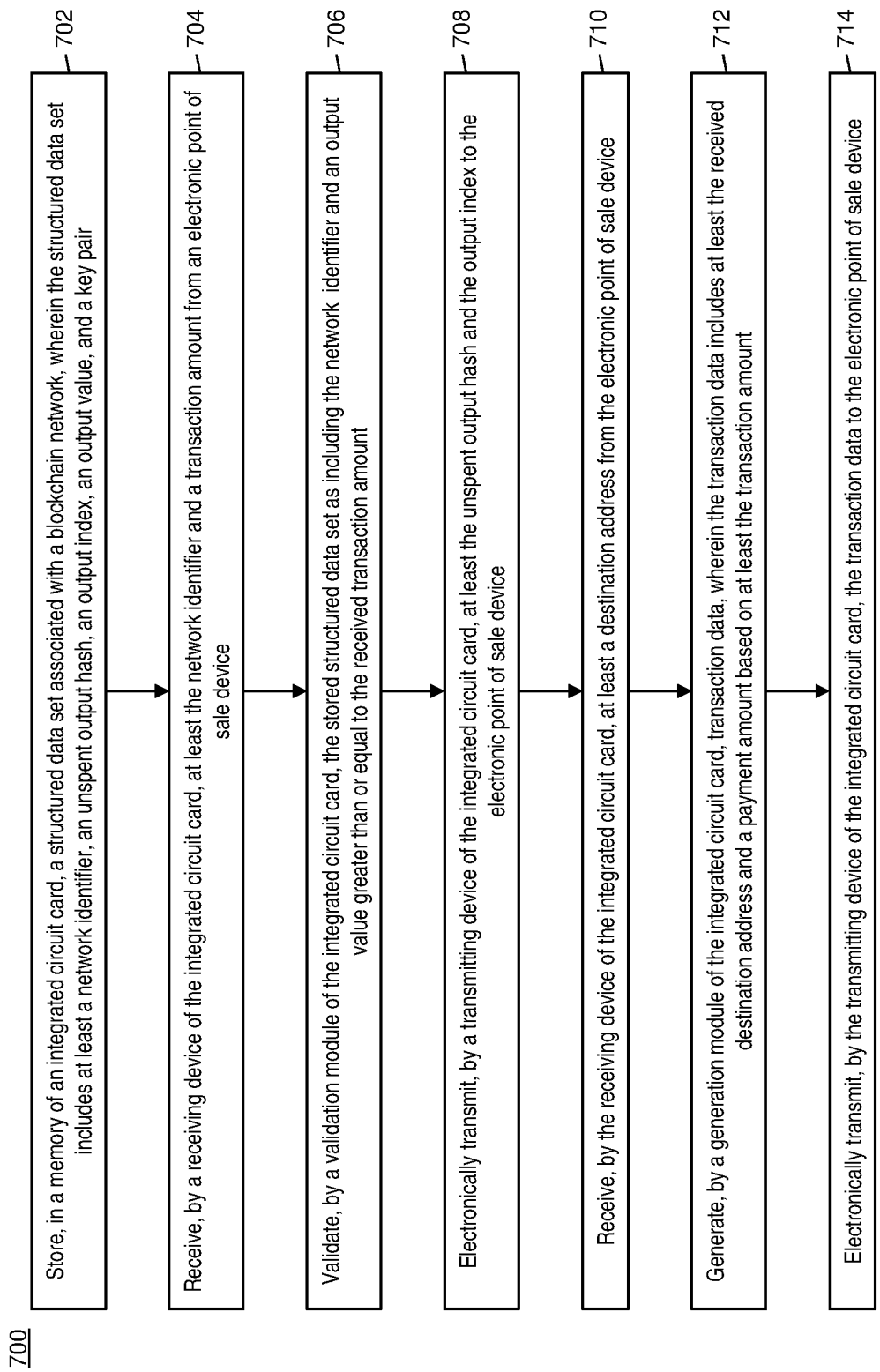
FIGS. 7 and 8 are flow charts illustrating exemplary methods for conducting of an offline data exchange associated with a blockchain in accordance with exemplary embodiments.

First Exemplary Method for Conducting an Offline Data Exchange Associated with a Blockchain FIG. 7 illustrates a method 700 for conducting an offline data exchange from the perspective of an integrated circuit card with an electronic point of sale device for processing an electronic transaction using a blockchain.

In step 702, a structured data set associated with a blockchain network (e.g., the blockchain network 110) may be stored in a memory (e.g., the memory 206) of an integrated circuit card (e.g., the integrated circuit card 102), wherein the structured data set includes at least a network identifier, an unspent output hash, an output index, an output value, and a key pair. In step 704, at least the network identifier and a transaction amount may be received by a receiving device (e.g., the receiving device 202) of the integrated circuit card from an electronic point of sale device (e.g., the electronic point of sale device 104).

In step 706, the stored structured data set may be validated by a validation module (e.g., the validation module 212) of the integrated circuit card as including the network identifier and an output value greater than or equal to the received transaction amount. In step 708, at least the unspent output hash and the output index may be electronically transmitted by a transmitting device (e.g., the transmitting device 208) of the integrated circuit card to the electronic point of sale device.

In step 710, at least a destination address may be received by the receiving device of the integrated circuit card from the electronic point of sale device. In step 712, transaction data may be generated by a generation module (e.g., the generation module 210) of the integrated circuit card, wherein the transaction data includes at least the received destination address and a payment amount based on at least the transaction amount. In step 714, the transaction may be electronically transmitted by the transmitting device of the integrated circuit card to the electronic point of sale device.

In one embodiment, the method 700 may also include signing, by a signing module (e.g., the signing module 214) of the integrated circuit card, the generated transaction data using a key included in the key pair included in the stored structured data set, wherein the transaction data electronically transmitted to the electronic point of sale device is the signed transaction data. In some embodiments, the method 700 may further include: receiving, by the receiving device of the integrated circuit card, an encrypted package from a payment network; and decrypting, by a decryption module (e.g., the decryption module 220) of the integrated circuit card, the received encrypted package to obtain the structured data set.

In one embodiment, the method 700 may also include: generating, by the generation module of the integrated circuit card, a new key pair; and generating, by the generation module of the integrated circuit card, a remainder address via application of one or more hashing algorithms to a public key included in the generated new key pair, wherein the transaction data further includes the generated remainder address. In a further embodiment, the method 700 may further include: generating, by the generation module of the integrated circuit card, a secondary structured data set, wherein the secondary structured data set includes at least the network identifier, a second output hash and second output index based on at least the transaction data, a second output value based on a difference between the output value and the transaction amount, and the generated new key pair; and storing, in the memory of the integrated circuit card, the generated secondary structured data set. In an even further embodiment, storing the generated secondary structured data set in the memory of the integrated circuit card may include replacing the structured data set.

In another further embodiment, the method 700 may further include encrypting, by an encryption module (e.g., the encryption module 218) of the integrated circuit card, the generated secondary structured data set to obtain an encrypted package; and electronically transmitting, by the transmitting device of the integrated circuit card, the encrypted package to a payment network. In an even further embodiment, the method 700 may also include deleting, in the memory of the integrated circuit card, the generated secondary structured data set upon transmission of the encrypted package.

Figure 8:
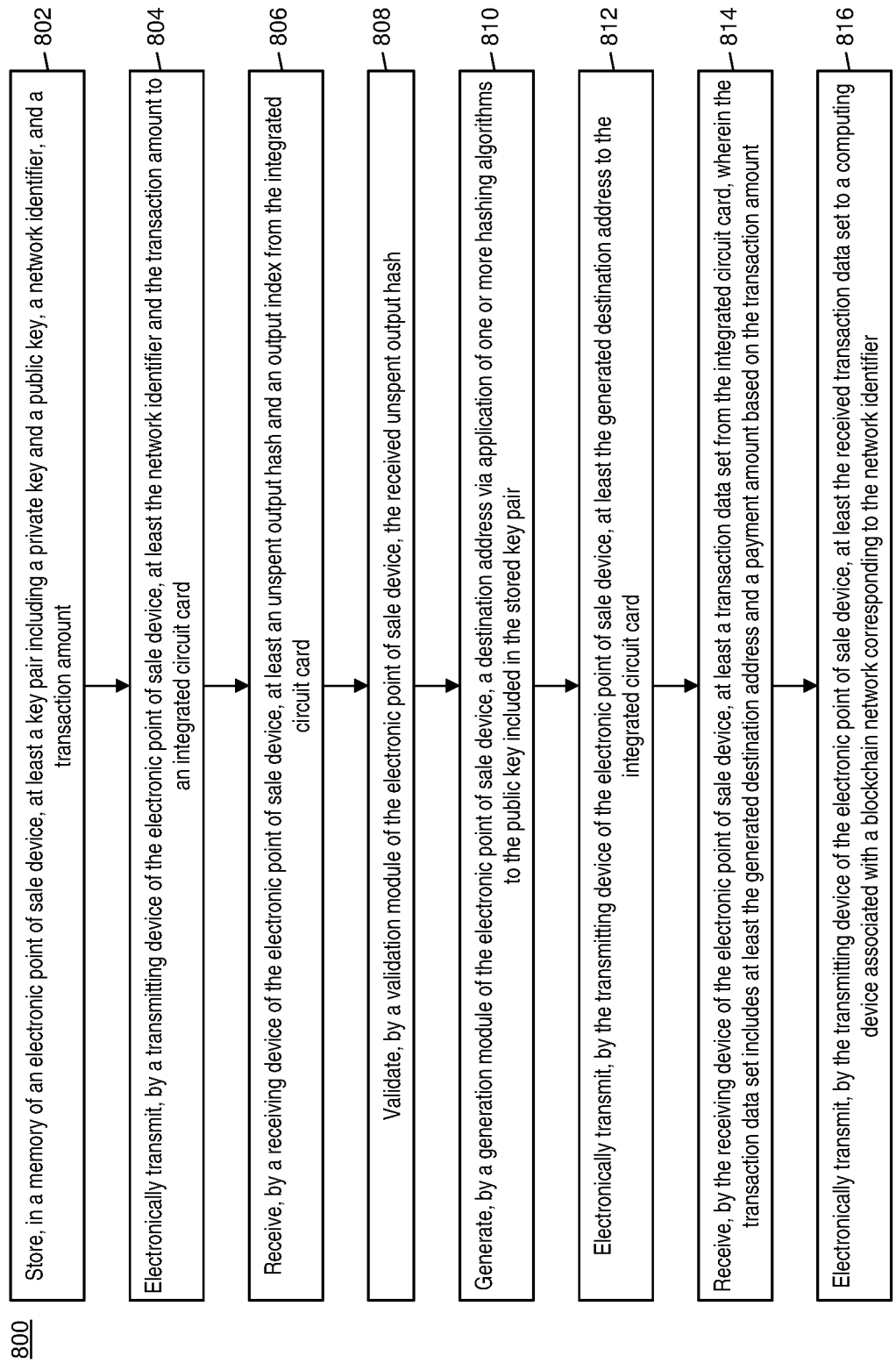

Second Exemplary Method for Conducting an Offline Data Exchange Associated with a Blockchain FIG. 8 illustrates a method 800 for conducting an offline data exchange from the perspective of an electronic point of sale device receiving data from an integrated circuit card for processing an electronic transaction using a blockchain.

In step 802, at least a key pair including a private key and public key, a network identifier, and a transaction amount may be stored in a memory (e.g., the memory 306) of an electronic point of sale device (e.g., the electronic point of sale device 104). In step 804, at least the network identifier and the transaction amount may be electronically transmitted by a transmitting device (e.g., the transmitting device 308) of the electronic point of sale device to an integrated circuit card (e.g., the integrated circuit card 102).

In step 806, at least an unspent output hash and an output index may be received by a receiving device (e.g., the receiving device 302) of the electronic point of sale device from the integrated circuit card. In step 808, a validation module (e.g., the validation module 312) of the electronic point of sale device may validate the received unspent output hash. In step 810, a destination address may be generated by a generation module (e.g., the generation module 310) of the electronic point of sale device via application of one or more hashing algorithms to the public key included in the stored key pair.

In step 812, at least the generated destination address may be electronically transmitted by the transmitting device of the electronic point of sale device to the integrated circuit card. In step 814, at least a transaction data set may be received from the integrated circuit card by the receiving device of the electronic point of sale device, wherein the transaction data set includes at least the generated destination address and a payment amount based on the transaction amount. In step 816, the transmitting device of the electronic point of sale device may electronically transmit at least the received transaction data set to a computing device (e.g., the computing device 108) associated with a blockchain network (e.g., the blockchain network 110) corresponding to the network identifier.

In one embodiment, the method 800 may further include: electronically transmitting, by the transmitting device of the electronic point of sale device, a data request including data based on the received unspent output hash and/or output index; and receiving, by the receiving device of the electronic point of sale device, a data set comprising previous transaction data included in a blockchain corresponding to the network identifier, wherein validation of the received unspent output hash includes a comparison of the received unspent output hash to data included in the received data set.

Payment Transaction Processing System and Process

Figure 9:
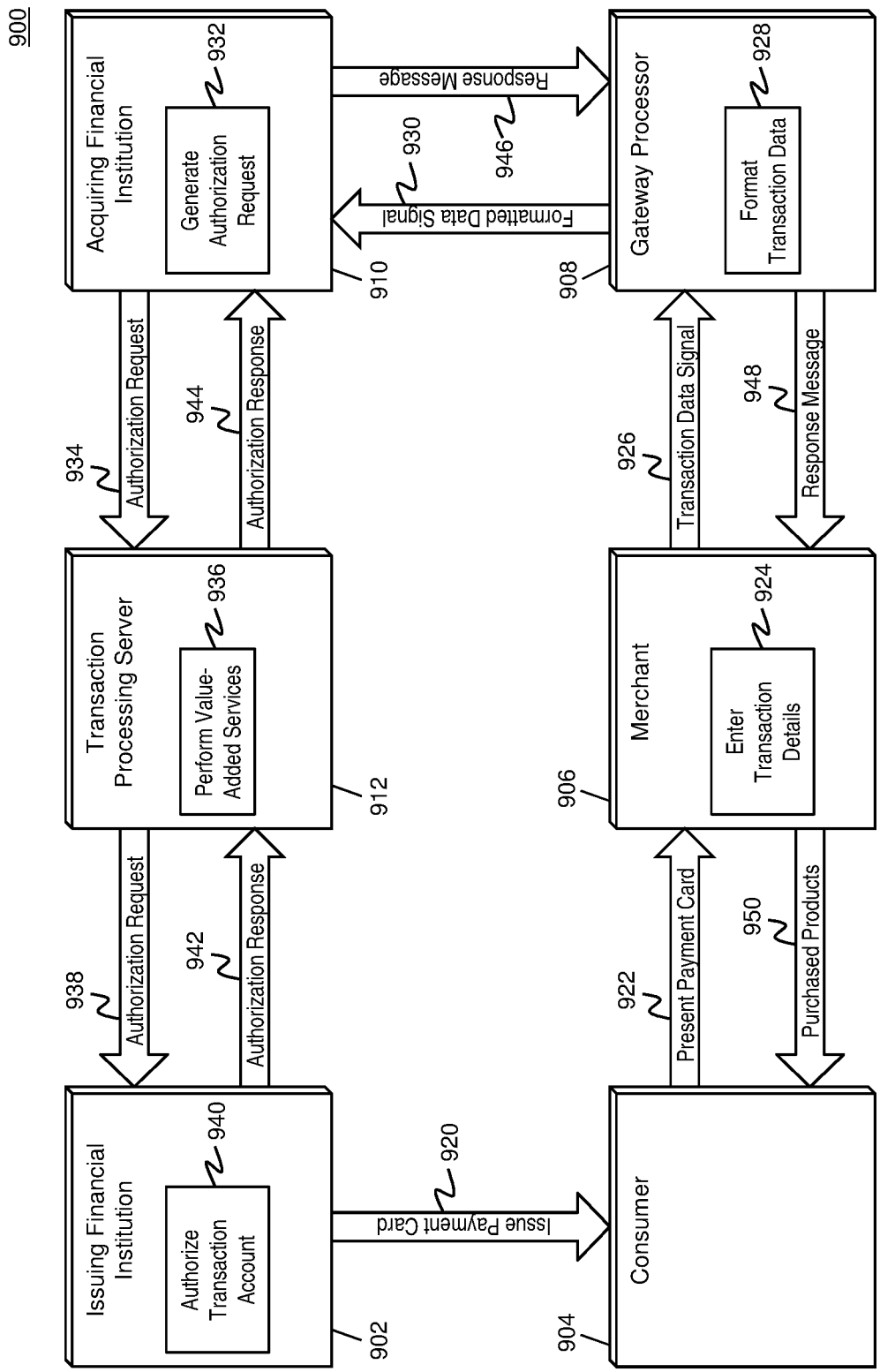
FIG. 9 is a flow diagram illustrating the processing of a payment transaction in accordance with exemplary embodiments.

FIG. 9 illustrates a transaction processing system and a process 900 for the processing of payment transactions in the system. The process 900 and steps included therein may be performed by one or more components of the system 100 discussed above, such as the integrated circuit card 102, electronic point of sale device 104, payment network 106, etc. The processing of payment transactions using the system and process 900 illustrated in FIG. 9 and discussed below may utilize the payment rails, which may be comprised of the computing devices and infrastructure utilized to perform the steps of the process 900 as specially configured and programmed by the entities discussed below, including the transaction processing server 912, which may be associated with one or more payment networks configured to processing payment transactions. It will be apparent to persons having skill in the relevant art that the process 900 may be incorporated into the processes illustrated in FIGS. 4, 5A, 5B, and 6-8, discussed above, with respect to the step or steps involved in the processing of a payment transaction. In addition, the entities discussed herein for performing the process 900 may include one or more computing devices or systems configured to perform the functions discussed below. For instance, the merchant 906 may be comprised of one or more point of sale devices, a local communication network, a computing server, and other devices configured to perform the functions discussed below.

In step 920, an issuing financial institution 902 may issue a payment card or other suitable payment instrument to a consumer 904. The issuing financial institution may be a financial institution, such as a bank, or other suitable type of entity that administers and manages payment accounts and/or payment instruments for use with payment accounts that can be used to fund payment transactions. The consumer 904 may have a transaction account with the issuing financial institution 902 for which the issued payment card is associated, such that, when used in a payment transaction, the payment transaction is funded by the associated transaction account. In some embodiments, the payment card may be issued to the consumer 904 physically. In other embodiments, the payment card may be a virtual payment card or otherwise provisioned to the consumer 904 in an electronic format.

In step 922, the consumer 904 may present the issued payment card to a merchant 906 for use in funding a payment transaction. The merchant 906 may be a business, another consumer, or any entity that may engage in a payment transaction with the consumer 904. The payment card may be presented by the consumer 904 via providing the physical card to the merchant 906, electronically transmitting (e.g., via near field communication, wireless transmission, or other suitable electronic transmission type and protocol) payment details for the payment card, or initiating transmission of payment details to the merchant 906 via a third party. The merchant 906 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 924, the merchant 906 may enter transaction details into a point of sale computing system. The transaction details may include the payment details provided by the consumer 904 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 906 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 906 may be an online retailer in an e-commerce transaction. In such embodiments, the transaction details may be entered in a shopping cart or other repository for storing transaction data in an electronic transaction as will be apparent to persons having skill in the relevant art.

In step 926, the merchant 906 may electronically transmit a data signal superimposed with transaction data to a gateway processor 908. The gateway processor 908 may be an entity configured to receive transaction details from a merchant 906 for formatting and transmission to an acquiring financial institution 910. In some instances, a gateway processor 908 may be associated with a plurality of merchants 906 and a plurality of acquiring financial institutions 910. In such instances, the gateway processor 908 may receive transaction details for a plurality of different transactions involving various merchants, which may be forwarded on to appropriate acquiring financial institutions 910. By having relationships with multiple acquiring financial institutions 910 and having the requisite infrastructure to communicate with financial institutions using the payment rails, such as using application programming interfaces associated with the gateway processor 908 or financial institutions used for the submission, receipt, and retrieval of data, a gateway processor 908 may act as an intermediary for a merchant 906 to be able to conduct payment transactions via a single communication channel and format with the gateway processor 908, without having to maintain relationships with multiple acquiring financial institutions 910 and payment processors and the hardware associated thereto. Acquiring financial institutions 910 may be financial institutions, such as banks, or other entities that administers and manages payment accounts and/or payment instruments for use with payment accounts. In some instances, acquiring financial institutions 910 may manage transaction accounts for merchants 906. In some cases, a single financial institution may operate as both an issuing financial institution 902 and an acquiring financial institution 910.

The data signal transmitted from the merchant 906 to the gateway processor 908 may be superimposed with the transaction details for the payment transaction, which may be formatted based on one or more standards. In some embodiments, the standards may be set forth by the gateway processor 908, which may use a unique, proprietary format for the transmission of transaction data to/from the gateway processor 908. In other embodiments, a public standard may be used, such as the International Organization for Standardization's ISO 8583 standard. The standard may indicate the types of data that may be included, the formatting of the data, how the data is to be stored and transmitted, and other criteria for the transmission of the transaction data to the gateway processor 908.

In step 928, the gateway processor 908 may parse the transaction data signal to obtain the transaction data superimposed thereon and may format the transaction data as necessary. The formatting of the transaction data may be performed by the gateway processor 908 based on the proprietary standards of the gateway processor 908 or an acquiring financial institution 910 associated with the payment transaction. The proprietary standards may specify the type of data included in the transaction data and the format for storage and transmission of the data. The acquiring financial institution 910 may be identified by the gateway processor 908 using the transaction data, such as by parsing the transaction data (e.g., deconstructing into data elements) to obtain an account identifier included therein associated with the acquiring financial institution 910. In some instances, the gateway processor 908 may then format the transaction data based on the identified acquiring financial institution 910, such as to comply with standards of formatting specified by the acquiring financial institution 910. In some embodiments, the identified acquiring financial institution 910 may be associated with the merchant 906 involved in the payment transaction, and, in some cases, may manage a transaction account associated with the merchant 906.

In step 930, the gateway processor 908 may electronically transmit a data signal superimposed with the formatted transaction data to the identified acquiring financial institution 910. The acquiring financial institution 910 may receive the data signal and parse the signal to obtain the formatted transaction data superimposed thereon. In step 932, the acquiring financial institution may generate an authorization request for the payment transaction based on the formatted transaction data. The authorization request may be a specially formatted transaction message that is formatted pursuant to one or more standards, such as the ISO 8583 standard and standards set forth by a payment processor used to process the payment transaction, such as a payment network. The authorization request may be a transaction message that includes a message type indicator indicative of an authorization request, which may indicate that the merchant 906 involved in the payment transaction is requesting payment or a promise of payment from the issuing financial institution 902 for the transaction. The authorization request may include a plurality of data elements, each data element being configured to store data as set forth in the associated standards, such as for storing an account number, application cryptogram, transaction amount, issuing financial institution 902 information, etc.

In step 934, the acquiring financial institution 910 may electronically transmit the authorization request to a transaction processing server 912 for processing. The transaction processing server 912 may be comprised of one or more computing devices as part of a payment network configured to process payment transactions. In some embodiments, the authorization request may be transmitted by a transaction processor at the acquiring financial institution 910 or other entity associated with the acquiring financial institution. The transaction processor may be one or more computing devices that include a plurality of communication channels for communication with the transaction processing server 912 for the transmission of transaction messages and other data to and from the transaction processing server 912. In some embodiments, the payment network associated with the transaction processing server 912 may own or operate each transaction processor such that the payment network may maintain control over the communication of transaction messages to and from the transaction processing server 912 for network and informational security.

In step 936, the transaction processing server 912 may perform value-added services for the payment transaction. Value-added services may be services specified by the issuing financial institution 902 that may provide additional value to the issuing financial institution 902 or the consumer 904 in the processing of payment transactions. Value-added services may include, for example, fraud scoring, transaction or account controls, account number mapping, offer redemption, loyalty processing, etc. For instance, when the transaction processing server 912 receives the transaction, a fraud score for the transaction may be calculated based on the data included therein and one or more fraud scoring algorithms and/or engines. In some instances, the transaction processing server 912 may first identify the issuing financial institution 902 associated with the transaction, and then identify any services indicated by the issuing financial institution 902 to be performed. The issuing financial institution 902 may be identified, for example, by data included in a specific data element included in the authorization request, such as an issuer identification number. In another example, the issuing financial institution 902 may be identified by the primary account number stored in the authorization request, such as by using a portion of the primary account number (e.g., a bank identification number) for identification.

In step 938, the transaction processing server 912 may electronically transmit the authorization request to the issuing financial institution 902. In some instances, the authorization request may be modified, or additional data included in or transmitted accompanying the authorization request as a result of the performance of value-added services by the transaction processing server 912. In some embodiments, the authorization request may be transmitted to a transaction processor (e.g., owned or operated by the transaction processing server 912) situated at the issuing financial institution 902 or an entity associated thereof, which may forward the authorization request to the issuing financial institution 902.

In step 940, the issuing financial institution 902 may authorize the transaction account for payment of the payment transaction. The authorization may be based on an available credit amount for the transaction account and the transaction amount for the payment transaction, fraud scores provided by the transaction processing server 912, and other considerations that will be apparent to persons having skill in the relevant art. The issuing financial institution 902 may modify the authorization request to include a response code indicating approval (e.g., or denial if the transaction is to be denied) of the payment transaction. The issuing financial institution 902 may also modify a message type indicator for the transaction message to indicate that the transaction message is changed to be an authorization response. In step 942, the issuing financial institution 902 may transmit (e.g., via a transaction processor) the authorization response to the transaction processing server 912.

In step 944, the transaction processing server 912 may forward the authorization response to the acquiring financial institution 910 (e.g., via a transaction processor). In step 946, the acquiring financial institution may generate a response message indicating approval or denial of the payment transaction as indicated in the response code of the authorization response, and may transmit the response message to the gateway processor 908 using the standards and protocols set forth by the gateway processor 908. In step 948, the gateway processor 908 may forward the response message to the merchant 906 using the appropriate standards and protocols. In step 950, the merchant 906 may then provide the products purchased by the consumer 904 as part of the payment transaction to the consumer 904, assuming the payment transaction is approved.

In some embodiments, once the process 900 has completed, payment from the issuing financial institution 902 to the acquiring financial institution 910 may be performed. In some instances, the payment may be made immediately or within one business day. In other instances, the payment may be made after a period of time, and in response to the submission of a clearing request from the acquiring financial institution 910 to the issuing financial institution 902 via the transaction processing server 912. In such instances, clearing requests for multiple payment transactions may be aggregated into a single clearing request, which may be used by the transaction processing server 912 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 940), the transaction processing server 912 may be configured to perform authorization of transactions on behalf of the issuing financial institution 902. Such actions may be referred to as "stand-in processing," where the transaction processing server "stands in" as the issuing financial institution 902. In such instances, the transaction processing server 912 may utilize rules set forth by the issuing financial institution 902 to determine approval or denial of the payment transaction, and may modify the transaction message accordingly prior to forwarding to the acquiring financial institution 910 in step 944. The transaction processing server 912 may retain data associated with transactions for which the transaction processing server 912 stands in, and may transmit the retained data to the issuing financial institution 902 once communication is reestablished. The issuing financial institution 902 may then process transaction accounts accordingly to accommodate for the time of lost communication.

In another example, if the transaction processing server 912 is unavailable for submission of the authorization request by the acquiring financial institution 910, then the transaction processor at the acquiring financial institution 910 may be configured to perform the processing of the transaction processing server 912 and the issuing financial institution 902. The transaction processor may include rules and data suitable for use in making a determination of approval or denial of the payment transaction based on the data included therein. For instance, the issuing financial institution 902 and/or transaction processing server 912 may set limits on transaction type, transaction amount, etc. that may be stored in the transaction processor and used to determine approval or denial of a payment transaction based thereon. In such instances, the acquiring financial institution 910 may receive an authorization response for the payment transaction even if the transaction processing server 912 is unavailable, ensuring that transactions are processed and no downtime is experienced even in instances where communication is unavailable. In such cases, the transaction processor may store transaction details for the payment transactions, which may be transmitted to the transaction processing server 912 (e.g., and from there to the associated issuing financial institutions 902) once communication is reestablished.

In some embodiments, transaction processors may be configured to include a plurality of different communication channels, which may utilize multiple communication cards and/or devices, to communicate with the transaction processing server 912 for the sending and receiving of transaction messages. For example, a transaction processor may be comprised of multiple computing devices, each having multiple communication ports that are connected to the transaction processing server 912. In such embodiments, the transaction processor may cycle through the communication channels when transmitting transaction messages to the transaction processing server 912, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 910 may identify that an authorization request involves an issuing financial institution 902 (e.g., via the bank identification number included in the transaction message) for which no value-added services are required. The transaction processor at the acquiring financial institution 910 may then transmit the authorization request directly to the transaction processor at the issuing financial institution 902 (e.g., without the authorization request passing through the transaction processing server 912), where the issuing financial institution 902 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 912 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 908, acquiring financial institution 910, etc.) for processing using this advanced network, and to quickly and efficiently receive a response regarding the ability for a consumer 904 to fund the payment transaction.

Computer System Architecture

Figure 10:
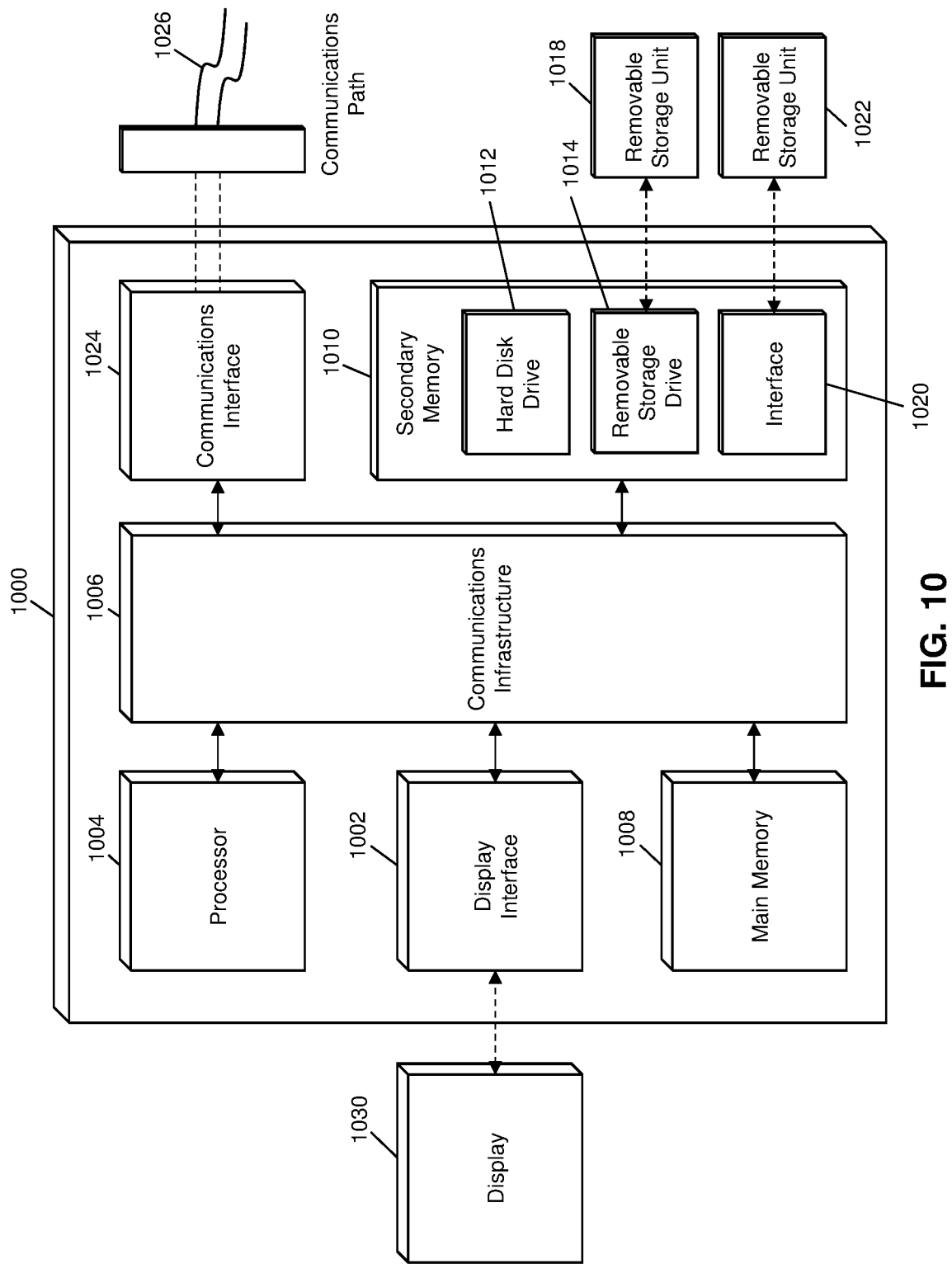
FIG. 10 is a block diagram illustrating a computer system architecture in accordance with exemplary embodiments.

FIG. 10 illustrates a computer system 1000 in which embodiments of the present disclosure, or portions thereof, may be implemented as computer-readable code. For example, the integrated circuit card 102 and electronic point of sale device 104 of FIG. 1 may be implemented in the computer system 1000 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4, 5A, 5B, and 6-9.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 1018, a removable storage unit 1022, and a hard disk installed in hard disk drive 1012.

Various embodiments of the present disclosure are described in terms of this example computer system 1000. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1004 may be a special purpose or a general purpose processor device specifically configured to perform the functions discussed herein. The processor device 1004 may be connected to a communications infrastructure 1006, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 1000 may also include a main memory 1008 (e.g., random access memory, read-only memory, etc.), and may also include a secondary memory 1010. The secondary memory 1010 may include the hard disk drive 1012 and a removable storage drive 1014, such as a floppy disk drive, a magnetic tape drive, an optical disk drive, a flash memory, etc.

The removable storage drive 1014 may read from and/or write to the removable storage unit 1018 in a well-known manner. The removable storage unit 1018 may include a removable storage media that may be read by and written to by the removable storage drive 1014. For example, if the removable storage drive 1014 is a floppy disk drive or universal serial bus port, the removable storage unit 1018 may be a floppy disk or portable flash drive, respectively. In one embodiment, the removable storage unit 1018 may be non-transitory computer readable recording media.

In some embodiments, the secondary memory 1010 may include alternative means for allowing computer programs or other instructions to be loaded into the computer system 1000, for example, the removable storage unit 1022 and an interface 1020. Examples of such means may include a program cartridge and cartridge interface (e.g., as found in video game systems), a removable memory chip (e.g., EEPROM, PROM, etc.) and associated socket, and other removable storage units 1022 and interfaces 1020 as will be apparent to persons having skill in the relevant art.

Data stored in the computer system 1000 (e.g., in the main memory 1008 and/or the secondary memory 1010) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 1000 may also include a communications interface 1024. The communications interface 1024 may be configured to allow software and data to be transferred between the computer system 1000 and external devices. Exemplary communications interfaces 1024 may include a modem, a network interface (e.g., an Ethernet card), a communications port, a PCMCIA slot and card, etc. Software and data transferred via the communications interface 1024 may be in the form of signals, which may be electronic, electromagnetic, optical, or other signals as will be apparent to persons having skill in the relevant art. The signals may travel via a communications path 1026, which may be configured to carry the signals and may be implemented using wire, cable, fiber optics, a phone line, a cellular phone link, a radio frequency link, etc.

The computer system 1000 may further include a display interface 1002. The display interface 1002 may be configured to allow data to be transferred between the computer system 1000 and external display 1030. Exemplary display interfaces 1002 may include high-definition multimedia interface (HDMI), digital visual interface (DVI), video graphics array (VGA), etc. The display 1030 may be any suitable type of display for displaying data transmitted via the display interface 1002 of the computer system 1000, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 1008 and secondary memory 1010, which may be memory semiconductors (e.g., DRAMs, etc.). These computer program products may be means for providing software to the computer system 1000. Computer programs (e.g., computer control logic) may be stored in the main memory 1008 and/or the secondary memory 1010. Computer programs may also be received via the communications interface 1024. Such computer programs, when executed, may enable computer system 1000 to implement the present methods as discussed herein. In particular, the computer programs, when executed, may enable processor device 1004 to implement the methods illustrated by FIGS. 4, 5A, 5B, and 6-9, as discussed herein. Accordingly, such computer programs may represent controllers of the computer system 1000. Where the present disclosure is implemented using software, the software may be stored in a computer program product and loaded into the computer system 1000 using the removable storage drive 1014, interface 1020, and hard disk drive 1012, or communications interface 1024.

The processor device 1004 may comprise one or more modules or engines configured to perform the functions of the computer system 1000. Each of the modules or engines may be implemented using hardware and, in some instances, may also utilize software, such as corresponding to program code and/or programs stored in the main memory 1008 or secondary memory 1010. In such instances, program code may be compiled by the processor device 1004 (e.g., by a compiling module or engine) prior to execution by the hardware of the computer system 1000. For example, the program code may be source code written in a programming language that is translated into a lower level language, such as assembly language or machine code, for execution by the processor device 1004 and/or any additional hardware components of the computer system 1000. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 1000 to perform the functions disclosed herein. It will be apparent to persons having skill in the relevant art that such processes result in the computer system 1000 being a specially configured computer system 1000 uniquely programmed to perform the functions discussed above.

Techniques consistent with the present disclosure provide, among other features, systems and methods for conducting an offline data exchange associated with a blockchain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for conducting an offline data exchange associated with a blockchain, comprising:
   storing, in a memory of an integrated circuit card, a structured data set associated with a blockchain network, wherein the structured data set includes at least a network identifier, an unspent output hash, an output index, an output value, and a key pair, wherein the network identifier identifies the blockchain network;
   receiving, by a receiving device of the integrated circuit card, a plurality of blockchain network identifiers and a transaction amount from an electronic point of sale device;
   validating, by a validation module of the integrated circuit card, the network identifier of the stored structured data set corresponds to at least one of the plurality of blockchain network identifiers and the stored structured data set includes an output value greater than or equal to the received transaction amount;
   electronically transmitting, by a transmitting device of the integrated circuit card, at least the unspent output hash and the output index to the electronic point of sale device based on the network identifier of the stored structured data set corresponding to at least one of the plurality of blockchain network identifiers;
   receiving, by the receiving device of the integrated circuit card, at least a destination address from the electronic point of sale device;
   generating, by a generation module of the integrated circuit card, transaction data, wherein the transaction data includes at least the received destination address and a payment amount based on at least the transaction amount; and
   electronically transmitting, by the transmitting device of the integrated circuit card, the transaction data to the electronic point of sale device, wherein
   the integrated circuit card is a physical payment card linked to a transaction account that includes an integrated circuit.

2. The method of claim 1, further comprising:
   signing, by a signing module of the integrated circuit card, the generated transaction data using a key included in the key pair included in the stored structured data set, wherein
   the transaction data electronically transmitted to the electronic point of sale device is the signed transaction data.

3. The method of claim 1, further comprising:
   generating, by the generation module of the integrated circuit card, a new key pair; and
   generating, by the generation module of the integrated circuit card, a remainder address via application of one or more hashing algorithms to a public key included in the generated new key pair, wherein
   the transaction data further includes the generated remainder address.

4. The method of claim 3, further comprising:
   generating, by the generation module of the integrated circuit card, a secondary structured data set, wherein the secondary structured data set includes at least the network identifier, a second output hash and second output index based on at least the transaction data, a second output value based on a difference between the output value and the transaction amount, and the generated new key pair; and
   storing, in the memory of the integrated circuit card, the generated secondary structured data set.

5. The method of claim 4, wherein storing the generated secondary structured data set in the memory of the integrated circuit card includes replacing the structured data set.

6. The method of claim 3, further comprising:
   encrypting, by an encryption module of the integrated circuit card, the generated secondary structured data set to obtain an encrypted package; and
   electronically transmitting, by the transmitting device of the integrated circuit card, the encrypted package to a payment network.

7. The method of claim 6, further comprising:
   deleting, in the memory of the integrated circuit card, the generated secondary structured data set upon transmission of the encrypted package.

8. The method of claim 1, further comprising:
   receiving, by the receiving device of the integrated circuit card, an encrypted package from a payment network; and
   decrypting, by a decryption module of the integrated circuit card, the received encrypted package to obtain the structured data set.

9. The method of claim 1, comprising:
   storing, in a memory of an integrated circuit card, one or more secondary structured data sets each associated with a different blockchain network, wherein each of the one or more secondary structured data sets include at least a network identifier, an unspent output hash, an output index, an output value, and a key pair, wherein the network identifier identifies the blockchain network;
   wherein the validating, by the validation module of the integrated circuit card, includes validating the network identifiers of the stored one or more secondary structured data sets correspond to at least one of the plurality of blockchain network identifiers; and
   wherein the electronically transmitting, by a transmitting device of the integrated circuit card, at least the unspent output hash and the output index to the electronic point of sale device is based on at least one of the network identifier of the stored structured data set or the one or more secondary data sets corresponds to at least one of the plurality of blockchain network identifiers.

10. The method of claim 9, wherein the structured data set and the one or more secondary structured data sets include a priority indication for use in a transaction.

11. A method for conducting an offline data exchange associated with a blockchain, comprising:
- storing, in a memory of an electronic point of sale device, at least a key pair including a private key and a public key, a plurality of blockchain network identifiers, and a transaction amount, wherein each of the plurality of blockchain network identifier identifies a different blockchain network;
- electronically transmitting, by a transmitting device of the electronic point of sale device, at least the plurality of blockchain network identifiers and the transaction amount to an integrated circuit card;
- receiving, by a receiving device of the electronic point of sale device, at least an unspent output hash and an output index from the integrated circuit card based on the integrated circuit card having a network identifier corresponding to at least one of the plurality of blockchain network identifiers;
- validating, by a validation module of the electronic point of sale device, the received unspent output hash;
- generating, by a generation module of the electronic point of sale device, a destination address via application of one or more hashing algorithms to the public key included in the stored key pair;
- electronically transmitting, by the transmitting device of the electronic point of sale device, at least the generated destination address to the integrated circuit card;
- receiving, by the receiving device of the electronic point of sale device, at least a transaction data set from the integrated circuit card, wherein the transaction data set includes at least the generated destination address and a payment amount based on the transaction amount; and
- electronically transmitting, by the transmitting device of the electronic point of sale device, at least the received transaction data set to a computing device associated with a blockchain network corresponding to the network identifier, wherein
- the integrated circuit card is a physical payment card linked to a transaction account that includes an integrated circuit.

12. The method of claim 11, further comprising:
- electronically transmitting, by the transmitting device of the electronic point of sale device, a data request including data based on the received unspent output hash and/or output index; and
- receiving, by the receiving device of the electronic point of sale device, a data set comprising previous transaction data included in a blockchain corresponding to the network identifier, wherein
- validation of the received unspent output hash includes a comparison of the received unspent output hash to data included in the received data set.

13. A system for conducting of offline data exchange associated with a blockchain, comprising:
- a generation module of an integrated circuit card;
- a memory of the integrated circuit card configured to store a structured data set associated with a blockchain network, wherein the structured data set includes at least a network identifier, an unspent output hash, an output index, an output value, and a key pair, wherein the network identifier identifies the blockchain network;
- a receiving device of the integrated circuit card configured to receive a plurality of blockchain network identifier and a transaction amount from an electronic point of sale device;
- a validation module of the integrated circuit card configured to validate the network identifier of the stored structured data set corresponds to at least one of the plurality of blockchain network identifiers and the stored structured data set includes an output value greater than or equal to the received transaction amount; and
- a transmitting device of the integrated circuit card configured to electronically transmit at least the unspent output hash and the output index to the electronic point of sale device based on the network identifier of the stored structured data set corresponding to at least one of the plurality of blockchain network identifiers, wherein
- the receiving device of the integrated circuit card is further configured to receive at least a destination address from the electronic point of sale device,
- the generation module of the integrated circuit card is configured to generate transaction data, wherein the transaction data includes at least the received destination address and a payment amount based on at least the transaction amount, and
- the transmitting device of the integrated circuit card is further configured to electronically transmit the transaction data to the electronic point of sale device, wherein
- the integrated circuit card is a physical payment card linked to a transaction account that includes an integrated circuit.

14. The system of claim 13, further comprising:
- a signing module of the integrated circuit card configured to sign the generated transaction data using a key included in the key pair included in the stored structured data set, wherein
- the transaction data electronically transmitted to the electronic point of sale device is the signed transaction data.

15. The system of claim 13, wherein
- the generation module of the integrated circuit card is further configured to generate
  - a new key pair, and
  - a remainder address via application of one or more hashing algorithms to a public key included in the generated new key pair, and
- the transaction data further includes the generated remainder address.

16. The system of claim 15, wherein
- the generation module of the integrated circuit card is further configured to generate a secondary structured data set, wherein the secondary structured data set includes at least the network identifier, a second output hash and second output index based on at least the transaction data, a second output value based on a difference between the output value and the transaction amount, and the generated new key pair, and
- the memory of the integrated circuit card is further configured to store the generated secondary structured data set.

17. The system of claim 16, wherein storing the generated secondary structured data set in the memory of the integrated circuit card includes replacing the structured data set.

18. The system of claim 15, further comprising:
- an encryption module of the integrated circuit card configured to encrypt the generated secondary structured data set to obtain an encrypted package, wherein
- the transmitting device of the integrated circuit card is further configured to electronically transmit the encrypted package to a payment network.

19. The system of claim 18, wherein the memory of the integrated circuit card is further configured to delete the generated secondary structured data set upon transmission of the encrypted package.

20. The system of claim 13, further comprising:
- a decryption module of the integrated circuit card, wherein
- the receiving device of the integrated circuit card is further configured to receive an encrypted package from a payment network, and
- the decryption module of the integrated circuit card is configured to decrypt the received encrypted package to obtain the structured data set.

21. A system for conducting an offline data exchange associated with a blockchain, comprising:
- a memory of an electronic point of sale device configured to store at least a key pair including a private key and a public key, a plurality of blockchain network identifiers, and a transaction amount, wherein each of the plurality of blockchain network identifier identifies a different blockchain network;
- a transmitting device of the electronic point of sale device configured to electronically transmit at least the plurality of blockchain network identifiers and the transaction amount to an integrated circuit card;
- a receiving device of the electronic point of sale device configured to receive at least an unspent output hash and an output index from the integrated circuit card based on the integrated circuit card having a network identifier corresponding to at least one of the plurality of blockchain network identifiers;
- a validation module of the electronic point of sale device configured to validate the received unspent output hash; and
- a generation module of the electronic point of sale device configured to generate a destination address via application of one or more hashing algorithms to the public key included in the stored key pair, wherein
- the transmitting device of the electronic point of sale device is further configured to electronically transmit at least the generated destination address to the integrated circuit card,
- the receiving device of the electronic point of sale device is further configured to receive at least a transaction data set from the integrated circuit card, wherein the transaction data set includes at least the generated destination address and a payment amount based on the transaction amount,
- the transmitting device of the electronic point of sale device is further configured to electronically transmit at least the received transaction data set to a computing device associated with a blockchain network corresponding to the network identifier, and
- the integrated circuit card is a physical payment card linked to a transaction account that includes an integrated circuit.

22. The system of claim 21, wherein
the transmitting device of the electronic point of sale device is further configured to electronically transmit a data request including data based on the received unspent output hash and/or output index,
the receiving device of the electronic point of sale device is further configured to receive a data set comprising previous transaction data included in a blockchain corresponding to the network identifier, and
validation of the received unspent output hash includes a comparison of the received unspent output hash to data included in the received data set.

\* \* \* \* \*